(12) United States Patent
Ikeda et al.

(10) Patent No.: US 6,945,232 B2
(45) Date of Patent: Sep. 20, 2005

(54) MOUNTING STRUCTURE FOR A FUEL INJECTION APPARATUS FOR AN ENGINE OF A SMALL SIZE VEHICLE

(75) Inventors: Kenichiro Ikeda, Saitama (JP); Kenji Oki, Saitama (JP); Koji Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/751,415

(22) Filed: Jan. 6, 2004

(65) Prior Publication Data

US 2005/0028790 A1 Feb. 10, 2005

(30) Foreign Application Priority Data

Jan. 10, 2003 (JP) ........................................ 2003-004582

(51) Int. Cl.$^7$ ............................................. F02M 33/04
(52) U.S. Cl. ...................................................... 123/470
(58) Field of Search .......................................... 123/470

(56) References Cited

U.S. PATENT DOCUMENTS

| | | | | |
|---|---|---|---|---|
| 5,758,623 A | * | 6/1998 | Nitta et al. ................. | 123/470 |
| 6,192,865 B1 | * | 2/2001 | Hori et al. .................. | 123/470 |
| 6,223,727 B1 | * | 5/2001 | Tahara et al. ............... | 123/470 |
| 6,640,784 B1 | * | 11/2003 | Sims, Jr. ..................... | 123/470 |
| 2001/0023685 A1 | * | 9/2001 | Nawa et al. ................ | 123/470 |

* cited by examiner

Primary Examiner—Thomas Moulis
(74) Attorney, Agent, or Firm—Birch Stewart Kolasch & Birch LLP

(57) ABSTRACT

To further enhance the durability of a fuel injection apparatus, to protect the fuel injection apparatus from external force by a simple configuration and to make it possible to readily perform an assembling operation or a maintenance or inspection operation of an engine on which the fuel injection apparatus is mounted. A motorcycle includes an engine having a cylinder extending forwardly and substantially horizontally. An intake port extends substantially rearwardly from an upper portion of a cylinder head of the engine, and a fuel injection apparatus for injecting fuel into a combustion chamber through the intake port, is disposed in the proximity of the cylinder head. A mounting boss is provided on an outer face of the intake port rearwardly of the fuel injection apparatus. The fuel injection apparatus is mounted on the mounting boss.

20 Claims, 17 Drawing Sheets

MOUNTING STRUCTURE FOR A FUEL INJECTION APPARATUS FOR AN ENGINE OF A SMALL SIZE VEHICLE

CROSS-REFERENCE TO RELATED APPLICATIONS

The present application claims priority under 35 USC 119 to Japanese Patent Application No. 2003-004582 filed on Jan. 10, 2003 the entire contents thereof is hereby incorporated by reference.

BACKGROUND OF THE INVENTION

1. Field of the Invention

This invention relates to a mounting structure for a fuel injection apparatus for an engine of a small size vehicle.

2. Description of Background Art

A technique for a small size vehicle such as a motorcycle is known wherein an engine having an engine extending in a forward direction and substantially horizontally is mounted and fuel is injected from a fuel injection apparatus into a combustion chamber of the engine through an intake port. See, for example, Japanese Patent Laid-Open No. 2001-138975, pages 5 to 7, FIGS. 7 to 9.

According to Japanese Patent Laid-Open No. 2001-138975, the conventional small size vehicle is configured such that it carries an engine having a cylinder extending in a forward direction and substantially horizontally and an intake port extends substantially rearwardly from an upper portion of a cylinder head of the engine. Further, a fuel injection apparatus is attached at an end portion thereof to a mounting opening of the intake port such that fuel is injected from the fuel injection apparatus into a combustion chamber of the engine through the intake port.

According to the conventional technique disclosed in Japanese Patent Laid-Open No. 2001-138975, the fuel injection apparatus is attached only at the end portion thereof to the mounting opening of the intake port. Since the fuel injection apparatus is of the type which is provided on a small size vehicle, road surface vibration during operation of the small size vehicle is transmitted to the fuel injection apparatus, and therefore, higher durability is demanded therefor.

Further, since the fuel injection apparatus projects upwardly from the intake port, a consideration against external force is required. For example, it is necessary to provide a comparatively great free space so that the fuel injection apparatus may not hit the vehicle body or some other member during operation of the vehicle. Therefore, there is room for improvement in order to increase the degree of freedom in the arrangement of various members. Further, when the engine on which the fuel injection apparatus is mounted is to be assembled relative to the vehicle body or when maintenance or inspection of the engine is to be performed, it is necessary to pay attention so that a rear portion of the fuel injection apparatus will not contact with another member.

SUMMARY AND OBJECTS OF THE INVENTION

Therefore, it is an object of the present invention to provide a technique by which the durability of a fuel injection apparatus can be further enhanced and the fuel injection apparatus can be protected from external force by a simple configuration. In addition, an assembling operation or a maintenance or inspection operation of an engine on which the fuel injection apparatus is mounted is provided which can be performed readily.

In order to attain the object described above, a mounting structure for a fuel injection apparatus for an engine of a small size vehicle such as a motorcycle which carries an engine having a cylinder extending in a forward direction and substantially horizontally is provided wherein an intake port extends substantially rearwardly from an upper portion of a cylinder head of the engine. A fuel injection apparatus for injecting fuel into a combustion chamber through the intake port is disposed in the proximity of the cylinder head. A mounting boss is provided on an outer face of the intake port rearwardly of the fuel injection apparatus and the fuel injection apparatus is mounted on the mounting boss.

According to the present invention, the mounting boss is provided on the outer face of the intake port rearwardly of the fuel injection apparatus which injects fuel into the combustion chamber through the intake port, and the fuel injection apparatus is mounted on the mounting boss. Consequently, the fuel injection apparatus can be mounted firmly on the outer face of the intake port. Therefore, road surface oscillation during operation that is transmitted to the fuel injection apparatus to cause resonance of the fuel injection apparatus can be suppressed very readily. As a result, the durability of the fuel injection apparatus can be further enhanced.

Further, according to the present invention, the fuel injection apparatus can be readily protected against external force from the rear by the mounting boss provided rearwardly of the fuel injection apparatus. Besides, since the mounting boss plays a role as a protection member for protecting the fuel injection apparatus, there is no necessity to provide a new protection member. Accordingly, the fuel injection apparatus can be protected with a simple configuration.

For example, a rear portion of the fuel injection apparatus can be positioned nearer to the body frame and other members. Therefore, the degree of freedom in the arrangement of the members can be increased and miniaturization of the small size vehicle can be anticipated.

Furthermore, when the engine mounted on the fuel injection apparatus is assembled to the vehicle body or maintenance or inspection of the engine is to be performed, there is no necessity to pay attention so that a rear portion of the fuel injection apparatus may not contact other members. Therefore, an assembling operation and a maintenance and inspection operation can be performed readily, and the number of man-hours for working can be reduced.

According to the present invention, the mounting structure for a fuel injection apparatus for an engine of a small size vehicle includes the mounting boss that is disposed in such a manner as to surround a rear portion of the fuel injection apparatus.

According to the present invention, the mounting boss which plays a roll also as a protection member is disposed such that it surrounds a rear portion of the fuel injection apparatus. Therefore, the fuel injection apparatus can be protected with a high degree of certainty against external force from the rear with a simple configuration.

According to the present invention, the mounting structure for a fuel injection apparatus for an engine of a small size vehicle includes a side wall which forms the cylinder head that is formed in such a manner as to extend along the fuel injection apparatus so that at least part of the fuel injection apparatus is surrounded by the side wall.

According to the present invention, since the side wall which forms the cylinder head is formed such that it extends along the fuel injection apparatus, at least part of the fuel injection apparatus can be surrounded by the side wall. Therefore, the fuel injection apparatus can be protected from external force even by the side wall which forms the cylinder head. As a result, the protection performance for protecting the fuel injection apparatus can be further enhanced. In addition, since at least part of the fuel injection apparatus is surrounded by the side wall, the operation sound of the fuel injection apparatus can be suppressed from being transmitted to the outside.

According to the present invention, the mounting structure for a fuel injection apparatus for an engine of a small size vehicle includes the fuel injection apparatus that is connected to a fuel supply system through a fuel supply joint connected to an upper portion thereof. The fuel supply joint is bolted to the mounting boss together with a mounting stay provided for mounting the fuel injection apparatus on the mounting boss.

According to the present invention, the fuel supply joint connected to an upper portion of the fuel injection apparatus is bolted to the mounting boss together with the mounting stay provided for mounting the fuel injection apparatus on the mounting boss. Therefore, the number of mounting bosses and bolts can be reduced by one half. Accordingly, the number of parts can be made small and the number of man-hours needed for the assembling operation can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
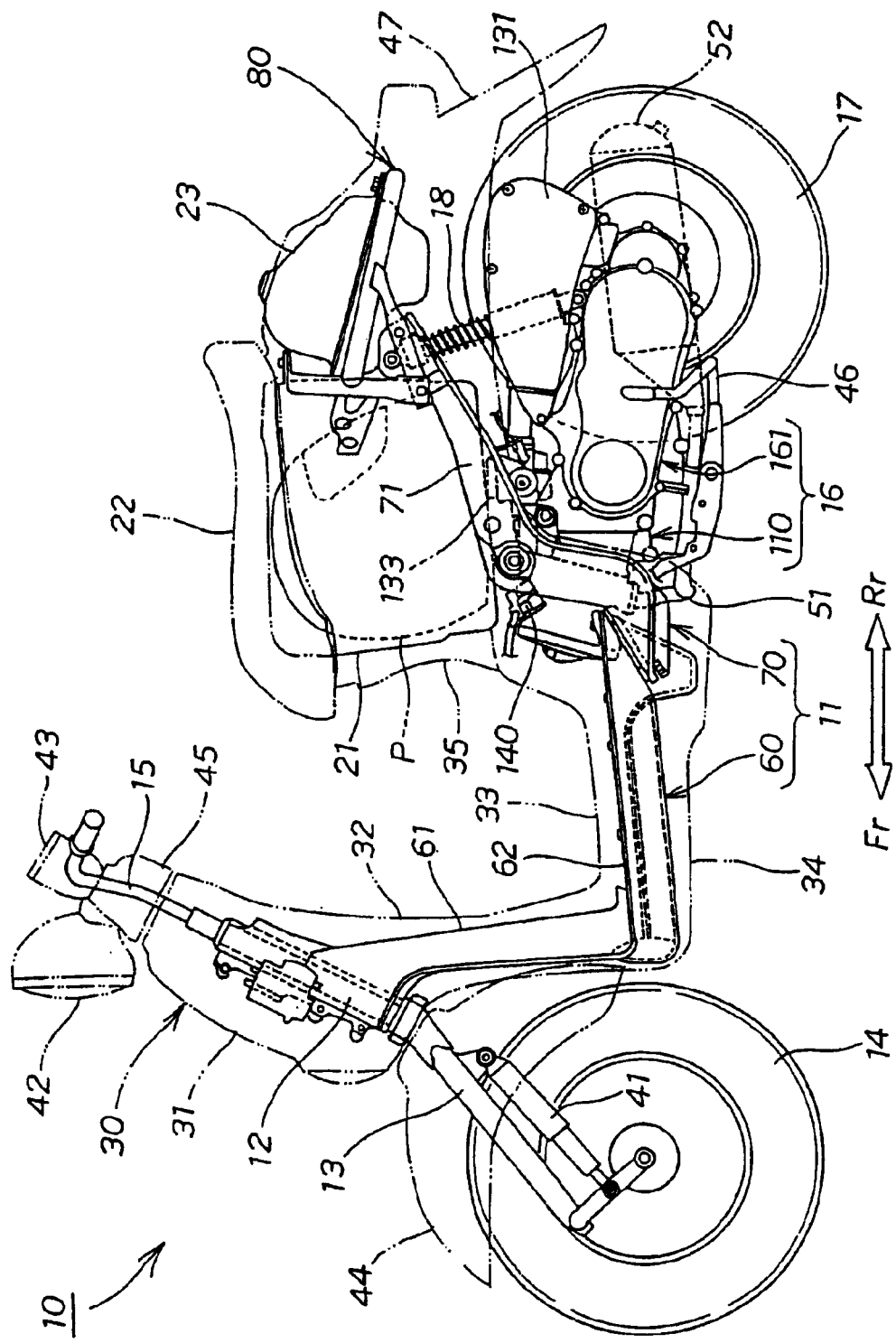
FIG. 1 is a left side elevational view of a motorcycle according to the present invention.

An embodiment of the present invention is described below with reference to the accompanying drawings. It is to be noted that the "front," "rear," "left," "right," "upper" and "lower" represent directions as viewed from a driver, and Fr denotes the front side, Rr the rear side, L the left side, R the right side, and CL the center in the widthwise direction (center of the vehicle body). Further, the drawings should be viewed in the direction of the reference characters.

FIG. 1 is a left side elevational view of a motorcycle according to the present invention.

A motorcycle 10 is a small size vehicle of the scooter type including, as principal components thereof, a body frame 11, a front fork 13, a front wheel 14, a handle bar 15, a swing type power unit 16, a rear wheel 17, a rear suspension 18, an article accommodation section 21, a seat 22, a fuel tank 23, and a body cover 30. The front fork 13 is mounted on a head pipe 12 of the body frame 11. The front wheel 14 is mounted on the front fork 13 and the handle bar 15 is connected to the front fork 13. The power unit 16 is mounted at a rear upper portion of the body frame 11. The rear wheel 17 is mounted at a rear portion of the power unit 16. The rear suspension 18 suspends the power unit 16 at a rear upper portion of the body frame 11. The article accommodation section 21 is mounted at a rear upper portion of the body frame 11. The seat 22 is mounted at an upper portion of the article accommodation section 21. The fuel tank 23 is mounted at a rear upper portion of the body frame 11 rearwardly of the article accommodation section 21. The body cover 30 covers the body frame 11.

The power unit 16 is disposed below the article accommodation section 21 and the seat 22. The article accommodation section 21 is an accommodation box for accommodating various articles P such as a helmet.

The body cover 30 includes a front cover 31, a leg shield 32, a step floor 33, an under cover 34, and a side cover 35. The front cover 31 covers a front portion of the head pipe 12. The leg shield 32 covers the legs of the driver. The step floor is for positioning the operator's legs. The under cover 34 is disposed below the step floor 33 and covers a lower portion of the body frame 11. The side cover 35 covers a rear half portion of the body frame 11.

As illustrated in FIG. 1, a front suspension 41, a headlamp 42, a meter 43, a front fender 44, a handle bar cover 45, a main stand 46, and a rear fender 47 are provided.

Figure 2:
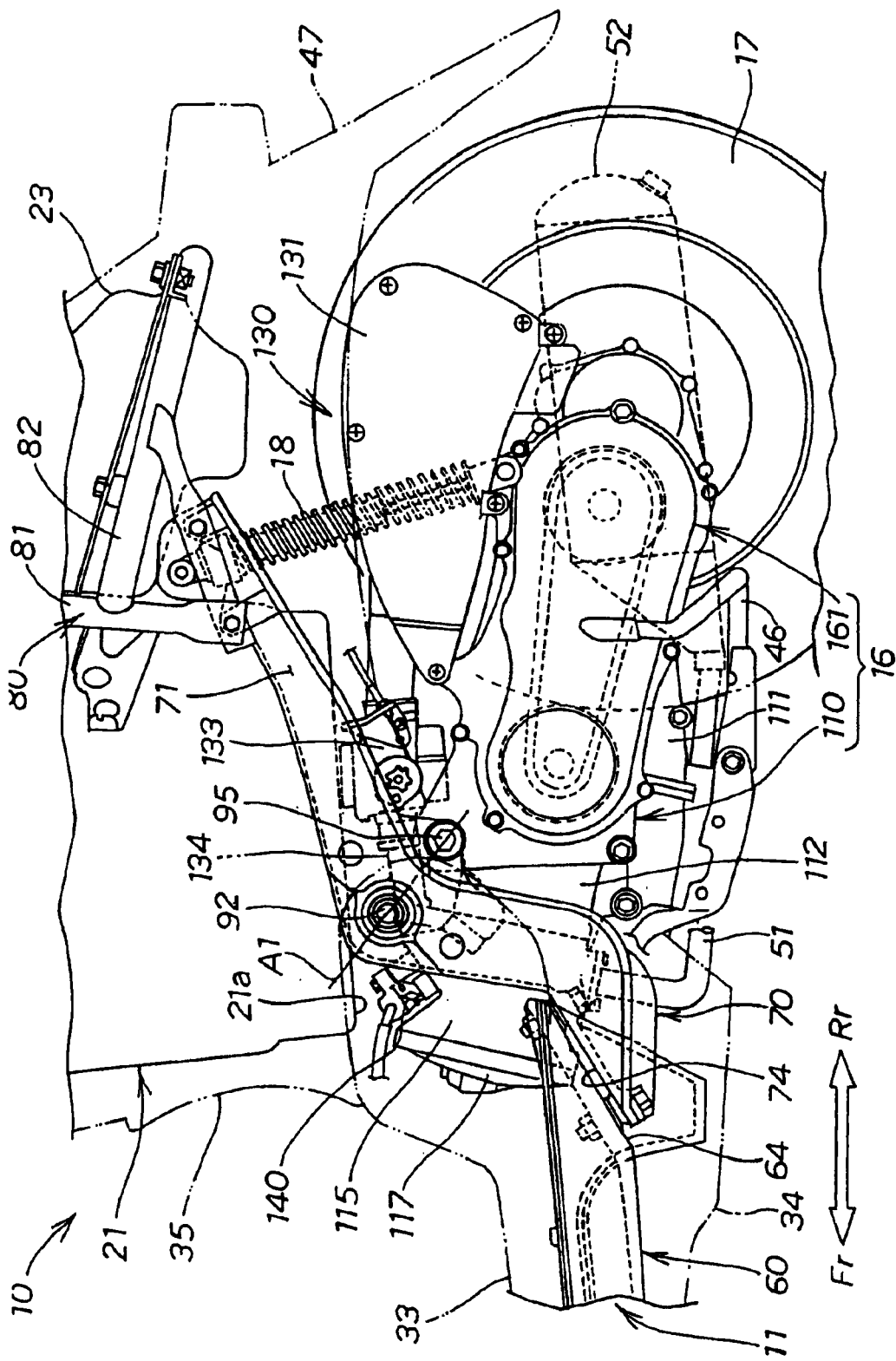
FIG. 2 is an enlarged side elevational view of a rear portion of the motorcycle according to the present invention.

FIG. 2 is an enlarged side elevational view of a rear portion of the motorcycle according to the present invention.

The body frame 11 is a divisional frame divided into two front and rear parts including a front frame 60 on the front side and a rear frame 70 on the rear side below the step floor 33. The rear frame 70 has a subframe 80 bolted to a rear end portion thereof.

The power unit 16 has a combination structure of an engine 110 on the front side and a non-stage transmission 161 on the rear side. The engine (internal combustion engine) 110 is a single-cylinder four-cycle water-cooled engine having a cylinder disposed substantially horizontally and directed forwardly of the vehicle body. The non-stage transmission 161 is, for example, a belt type transmission.

FIG. 2 illustrates that an air cleaner 131 is disposed to the left of the rear wheel 17 and is mounted at a rear upper portion of the power unit 16. An exhaust pipe 51 for the engine and a muffler 52 are provided.

Figure 3:
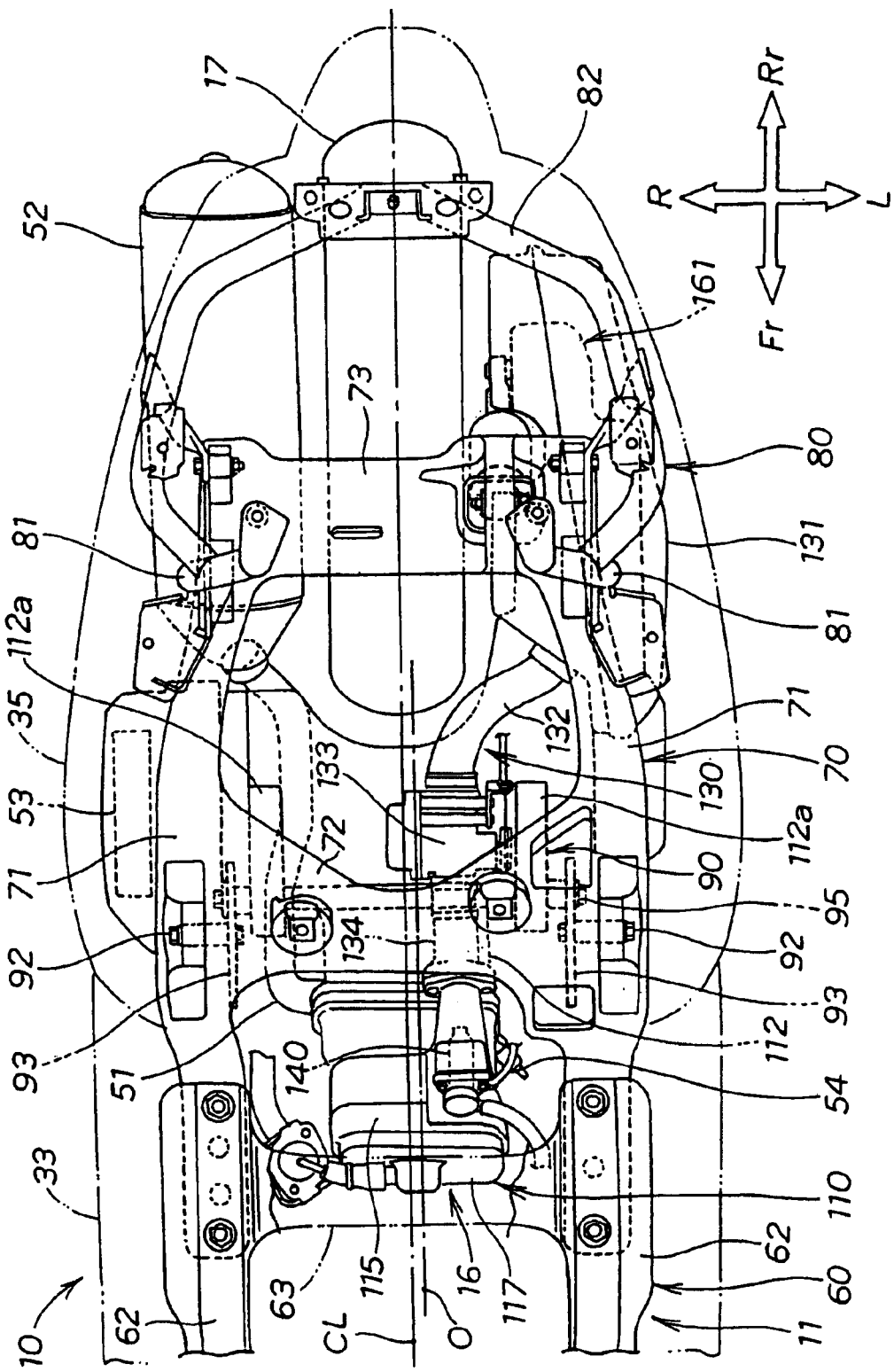
FIG. 3 is an enlarged plan view of a rear portion of the motorcycle according to the present invention.

FIG. 3 is an enlarged plan view of a rear portion of the motorcycle according to the present invention that illustrates an engine radiator 53 that is provided integrally on the right side of the power unit 16.

The subframe 80 includes a pair of left and right article accommodation section posts 81, 81 erected uprightly and a connecting stay 82 interconnecting the article accommodation section posts 81, 81. An ignition plug 54 is provided.

Figure 4:
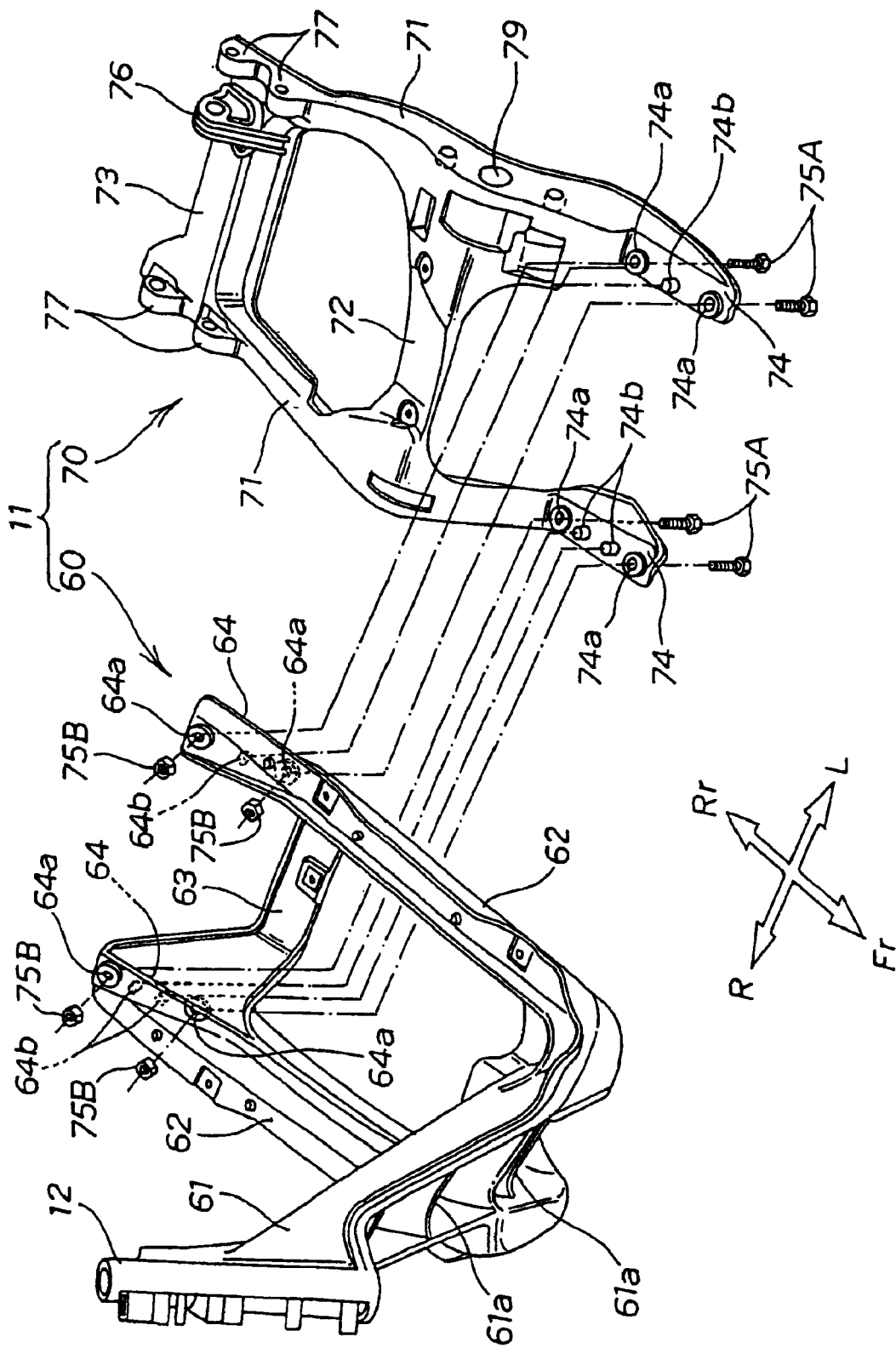
FIG. 4 is an exploded perspective view of a body frame according to the present invention.

FIG. 4 is an exploded perspective view of the body frame according to the present invention.

The front frame 60 is an integrally cast frame having a substantially square frame shape as viewed in plan and includes the head pipe 12, a down frame portion 61, a pair of left and right floor supporting frame portions 62, 62, and a cross member 63. The down frame portion 61 extends downwardly from the head pipe 12. The floor supporting frame portions 62, 62 extend rearwardly in a bifurcated fashion from a lower end of the down frame portion 61. The cross member 63 extends between rear ends of the floor supporting frame portions 62, 62.

The down frame portion 61 is a channel-shaped frame open at a front portion and a lower portion thereof and has a plurality of ribs 61a formed integrally in the channel thereof.

The left and right floor supporting frame portions 62, 62 are channel-shaped frames which are open at an upper portion thereof and extend straightforwardly. Rear end portions of the left and right floor supporting frame portions 62, 62 are formed with inclined faces inclined forwardly and downwardly, and the inclined faces are formed as front coupling faces 64, 64, each of which has two bolt holes 64a formed at front and rear portions thereof. Further, one fitting recess 64b is formed on the left front coupling face 64 while two front and rear fitting recesses 64b, 64b are formed on the right front coupling face 64.

The cross member 63 is a channel-shaped member open at an upper portion thereof as viewed in a front elevation, and the height of a central portion of the cross member 63 of the vehicle in a widthwise direction is set lower than that of the floor supporting frame portions 62, 62.

The rear frame 70 is a unitary cast frame including a pair of left and right main frame portions 71, 71, a front cross member 72, and a rear cross member 73. The front cross member 72 extends between intermediate portions in the forward and rearward direction of the main frame portions 71, 71. The rear cross member 73 extends between rear ends of the left and right main frame portions 71, 71.

The left and right main frame portions 71, 71 are members each of which has a front end portion extending substantially horizontally and extending upwardly from a rear end of the front end portion and further rearwardly and upwardly from an upper end of the upwardly extending portion such that it is generally inclined rearwardly and upwardly. The front end portions of the main frame portions 71, 71 are formed with inclined faces inclined forwardly and downwardly, and the inclined faces are formed as rear coupling faces 74, 74, each of which has two bolt holes 74a formed at front and rear portions thereof. Furthermore, three fitting projections 74b for fitting with the fitting recesses 64b, 64b are formed on the rear coupling faces 74, 74.

The rear frame 70 can be coupled integrally to the front frame 60 by placing the front coupling faces 64, 64 on the rear coupling faces 74, 74, coupling and positioning the fitting projections 74b with the fitting recesses 64b and coupling the front frame 60 and the rear frame 70 by means of bolts 75A and nuts 75B fitted in the bolt holes 64a and the bolt holes 74a, respectively.

The front frame 60 and the rear frame 70 are cast articles of, for example, an aluminum alloy. In FIG. 4, a rear suspension mounting portion 76 and subframe mounting portions 77 are provided.

Figure 5:
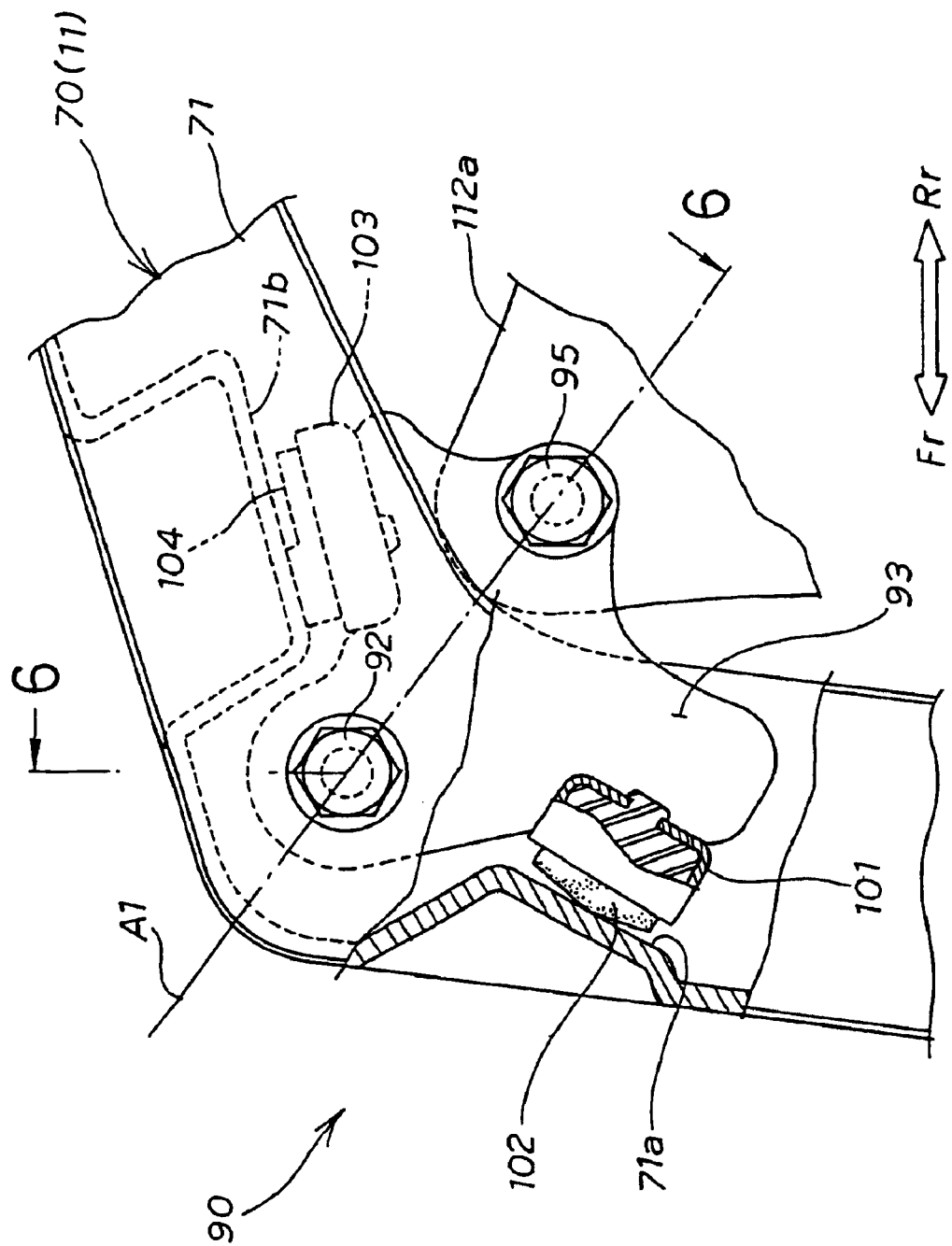
FIG. 5 is a left side elevational view, partly in section, of a power unit mounting structure according to the present invention.

FIG. 5 is a left side elevational view, partly in section, of a power unit mounting structure according to the present invention wherein the power unit 16 (refer to FIG. 2) is adapted to be mounted at a front portion thereof for upward and downward swinging motion on the rear frame 70 of the body frame 11 through a damping link mechanism 90 that has a damping function.

Figure 6:
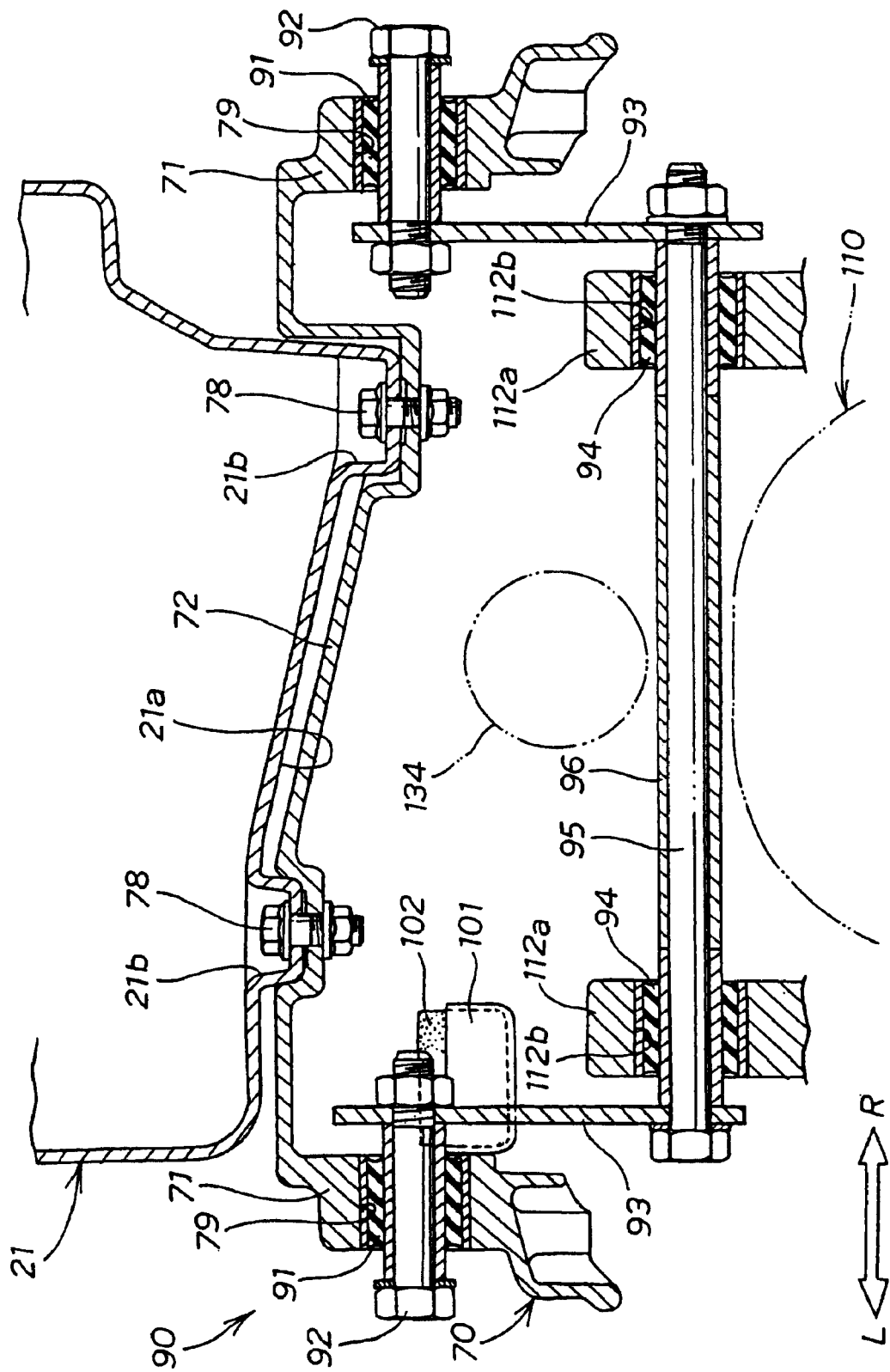
FIG. 6 is a sectional view taken along line 6—6 of FIG. 5.

FIG. 6 is a sectional view taken along line 6—6 of FIG. 5 that illustrates the article accommodation section 21 in a state mounted on the rear frame 70.

The article accommodation section 21 has a bottom portion 21a inclined from the left to the right of the vehicle body and a pair of left and right front leg portions 21b, 21b swollen downwardly from the bottom portion 21a and formed integrally with the bottom portion 21a.

The article accommodation section 21 can be mounted at a front lower portion thereof onto the rear frame 70 by placing the left and right front leg portions 21b, 21b onto the front cross member 72 and fastening them together with bolts-nuts 78, 78.

The damping link mechanism 90 includes a pair of left and right frame side pivots 92, 92 provided on the left and right main frame portions 71, 71 of the rear frame 70 and an engine side pivot 95 provided on the engine 110 at a rear lower position with respect to the frame side pivots 92, 92. Thus, the damping link mechanism 90 is a mechanism which supports the engine side pivot 95 for rocking motion (swinging motion) on the left and right frame side pivots 92, 92 through a pair of left and right damping links 93, 93.

More particularly, the left and right main frame portions 71, 71 have a pair of left and right supporting holes 79, 79 perforated coaxially at intermediate portions thereof. Rubber bushings 91, 91 are mounted in the supporting holes 79, 79 by force fitting, and a pair of left and right frame side pivots (first pivot shafts) 92, 92 are fitted in the rubber bushings 91, 91. Further, the pair of left and right damping links 93, 93 are mounted at upper end portions thereof for upward and downward swinging motion on the pair of left and right frame side pivots 92.

In addition, in the engine 110, a pair of left and right hanger portions 112a, 112a are formed integrally on a cylinder block 112 (refer to FIG. 2), and a pair of left and right supporting holes 112b, 112b are perforated coaxially in the hanger portions 112a, 112a. Rubber bushings 94, 94 are mounted in the supporting holes 112b, 112b by force fitting, and a single elongated engine side pivot (second pivot shaft) 95 is fitted in the rubber bushings 94, 94. The left and right damping links 93, 93 are mounted at lower end portions thereof for upward and downward swinging motion on the engine side pivot 95. A spacer 96 in the form of a pipe is provided.

As is apparent from the foregoing description, (1) the left and right damping links 93, 93 are mounted at upper end portions thereof for upward and downward swinging motion on the left and right main frame portions 71, 71 through the rubber bushings 91, 91 and the frame side pivots 92, 92, and (2) the engine 110 can be mounted at the left and right hanger portions 112a, 112a thereof for upward and downward swinging motion at lower end portions of the left and right damping links 93, 93 through the rubber bushings 94, 94 and the engine side pivot 95. In addition, vibration of the engine 110 can be absorbed through resilient deformation of the rubber bushings 91, 91, 94, 94.

Description is continued with reference to FIG. 5 wherein the left or right damping link 93 has a front rubber stopper 102 provided at a front end portion thereof and has a rear rubber stopper 104 provided at a rear end portion thereof.

More particularly, one of the left and right damping links 93, 93 has a box-shaped front rubber mounting portion 101 mounted at a portion thereof forwardly of a straight line A1 which passes the frame side pivot 92 and the engine side pivot 95. The front rubber stopper 102 formed from an elastic member is mounted on the front rubber mounting portion 101. Further, the damping link 93 has a box-shaped rear rubber mounting portion 103 at a portion thereof rearwardly of the straight line A1, and the rear rubber stopper 104 formed from an elastic member is mounted on the rear rubber mounting portion 103.

The main frame portion 71 has formed thereon a front stopper face 71a for engaging with the front rubber stopper 102 and a rear stopper face 71b for engaging with the rear rubber stopper 104. Accordingly, swinging motion of the left and right damping links 93, only the left side one is shown in FIG. 5, is resiliently restricted by the front and rear stopper faces 71a, 71b and the front and rear rubber stoppers 102, 104. In other words, the front and rear rubber stoppers 102, 104 perform a damping action when the left and right damping links 93, 93 swing upwardly and downwardly and perform a restoring action to the neutral position of the damping links 93, 93 shown in FIGS. 4 and 5.

Figure 7:
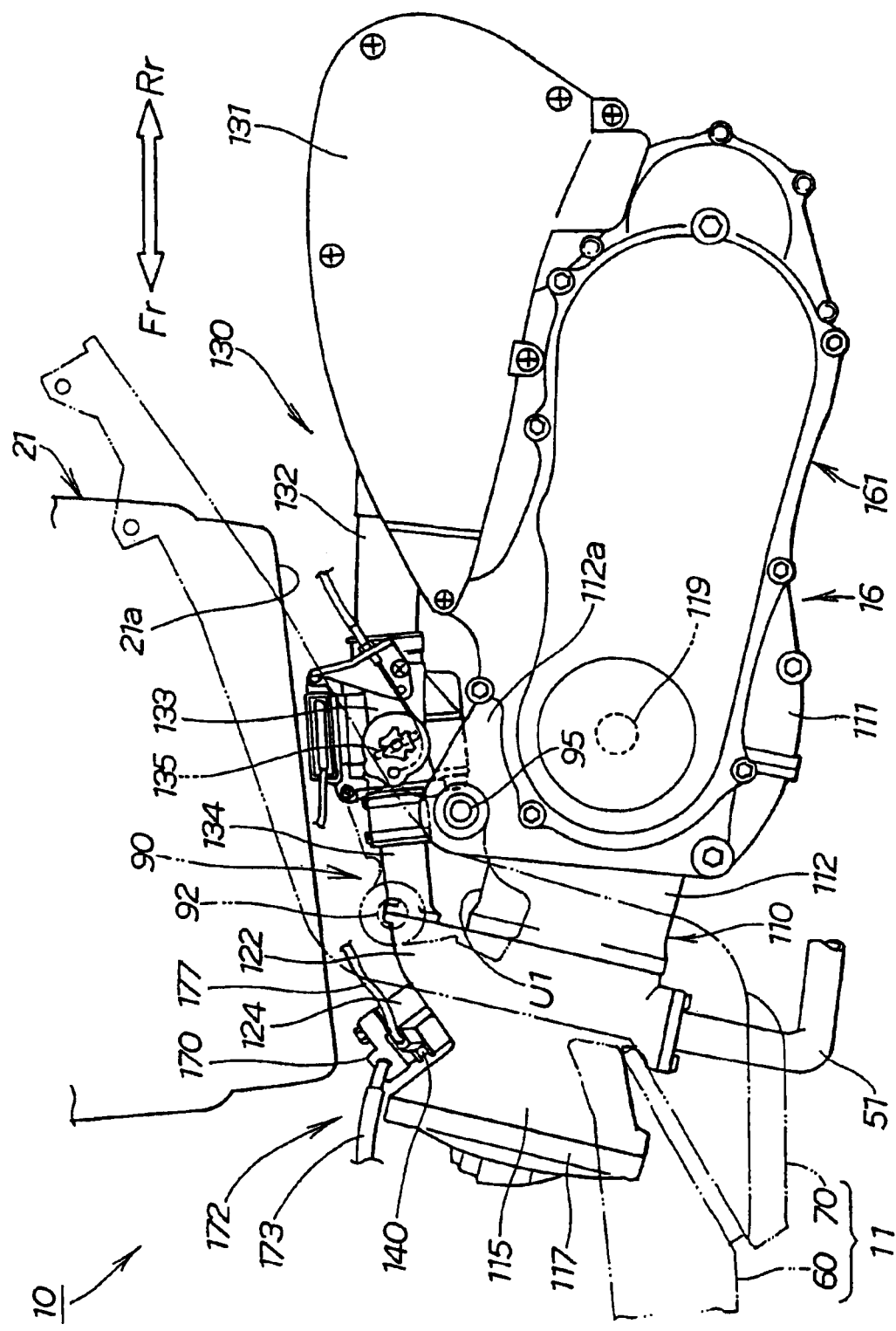
FIG. 7 is a side elevational view of a swing type power unit according to the present invention with members disposed.

FIG. 7 is a side elevational view of the swing type power unit according to the present invention.

The engine 110 includes the cylinder block 112 and a cylinder (not shown) in the cylinder block 112 which extend forwardly and substantially horizontally from the body frame 11 in the forward direction of the vehicle body. A cylinder head 115 is joined to a front end of the cylinder block 112 by bolting and a head cover 117 is joined to a front end of the cylinder head 115 by bolting.

FIG. 7 illustrates an intake system 130 for the engine 110 that is formed from the air cleaner 131, a connecting tube 132, a throttle body 133, an inlet pipe 134 and an intake port (intake path) 122. The connecting tube 132 is connected to an exit of the air cleaner 131. The throttle body 133 is connected to a downstream end of the connecting tube 132. The inlet pipe 134 is connected to a downstream end of the throttle body 133. The intake port 122 is connected to a downstream end of the inlet pipe 134.

In the intake system 130 having such a configuration as just described, the air cleaner 131, connecting tube 132, throttle body 133 and inlet pipe 134 are disposed above the engine 110 in a state wherein they extend substantially horizontally from a rear portion to a front portion of the vehicle body. Further, the downstream end of the inlet pipe 134 is connected to the intake port 122 of the engine 110.

The throttle body 133 is connected to an upstream end of the inlet pipe 134 and disposed substantially above a crankcase 111, and has a throttle valve 135 built therein. The throttle valve 135 is a valve disposed on the upstream side of the intake port 122 for adjusting the cross-sectional area of the intake port 122.

The pair of left and right frame side pivots 92, only the left side one is shown in FIG. 7, are positioned rather near to the bottom portion 21a of the article accommodation section 21 between the bottom portion 21a of the article accommodation section 21 and an upper face U1 of the engine 110, and the engine side pivot 95 is disposed at a position rearwardly and downwardly of the frame side pivot 92. Furthermore, a fuel injection apparatus 140 is disposed on the forward side of the vehicle body with respect to the frame side pivot 92.

Figure 8:
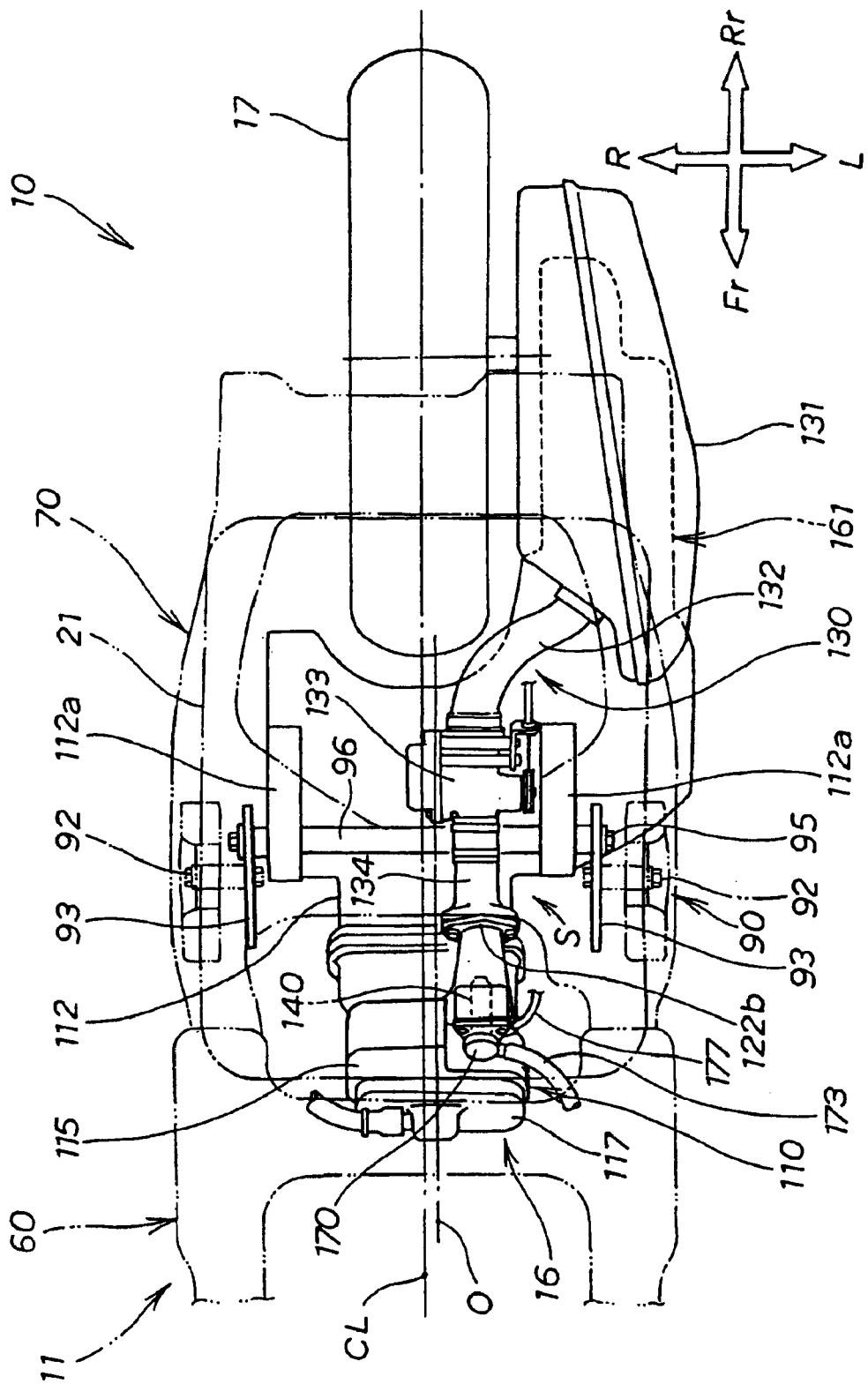
FIG. 8 is a plan view of the swing type power unit according to the present invention with members disposed.

FIG. 8 is a plan view of the swing type power unit according to the present invention and illustrating the inlet pipe 134 that is laid in a space S defined between the pair of left and right damping links 93, 93. The inlet pipe 134 is an intake pipe which extends substantially in parallel to a cylinder axis O and has an upstream end directed rearwardly of the vehicle body.

Figure 9:
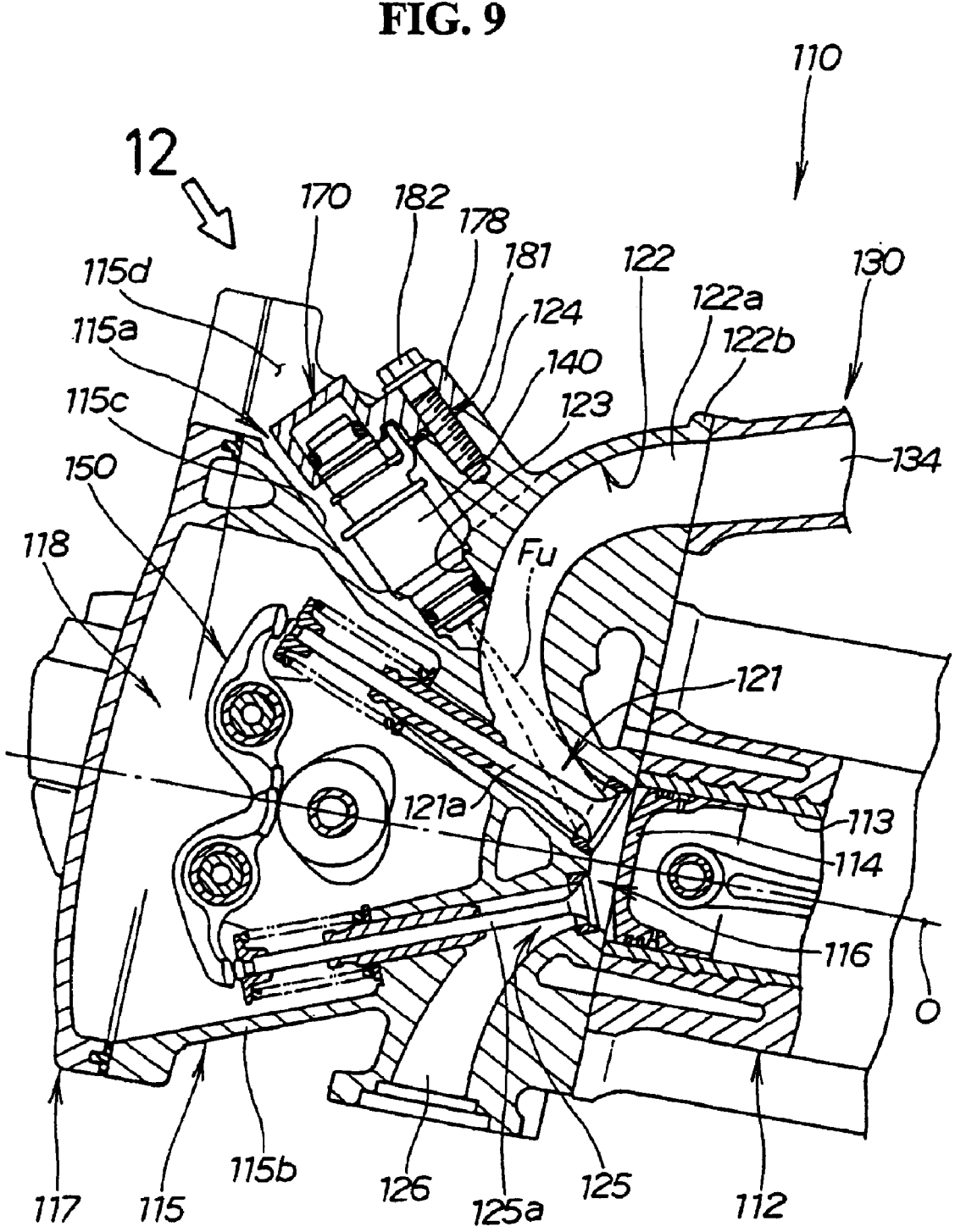
FIG. 9 is a side elevational sectional view of a cylinder head of an engine according to the present invention with members disposed.

FIG. 9 is a side elevational sectional view of the cylinder head of the engine according to the present invention.

In the engine 110, the cylinder 113 in the cylinder block 112 extends substantially horizontally from the crankcase 111, refer to FIG. 2, to the front of the vehicle body. A piston 114 is fitted in the cylinder 113, and a combustion chamber 116 is provided in the cylinder head 115. A valve chamber 118 is defined by the cylinder head 115 and the head cover 117 and a valve system 150 is accommodated in the valve chamber 118.

The cylinder head 115 has the intake port 122 and an exhaust path 126 formed integrally with each other therein. The intake port 122 connects to the combustion chamber 116 and includes an intake valve 121. The exhaust path 126 connects to the combustion chamber 116 and includes an exhaust valve 125.

The intake valve 121 is a valve disposed between the combustion chamber 116 and the intake port 122 for connecting and disconnecting them to and from each other, and includes a valve stem 121a. The exhaust valve 125 is a valve disposed between the combustion chamber 116 and the exhaust path 126 for connecting and disconnecting them to and from each other, and includes a valve stem 125a.

The intake port 122 is a path of a substantially U shape. In particular, it extends substantially in parallel to the axis O of the cylinder 113 from the position of the intake valve 121 from the downstream side connecting to the combustion chamber 116 towards the upstream side such that it is spaced away, to the left side in FIG. 9 from the combustion chamber 116. Then, the intake port 122 is bent outwardly at a substantially right angle to the axis O and then extends substantially in parallel to the axis O again. The path has a convex shape toward the front of the vehicle body, to the left side of FIG. 9, within the cylinder head 115. In this manner, the intake port 122 extends substantially rearwardly from an upper portion of the cylinder head 115 of the engine 110.

The intake port 122 having such a shape as described above is open at an upstream end 122a thereof toward the rear of the vehicle body, to the right side in FIG. 9, at an upper portion of the cylinder head 115. A flange 122b is formed at the opening of the intake port 122 and is connected to a downstream end of the inlet pipe 134 by bolting.

As illustrated in FIG. 7, the fuel injection apparatus 140 is disposed between the throttle valve 135 positioned on the upstream side of the inlet pipe 134 in the intake system 130 and the intake valve 121, and the fuel injection apparatus 140 is mounted on the engine 110 in a state wherein it is directed from a front upper location to a lower downward location.

More particularly, a mounting opening 123 is formed at the curved bottom portion of the substantially U-shaped intake port 122, that is, at a front end portion, on the left side in FIG. 9, of the intake port 122, and the fuel injection apparatus 140 is mounted in the mounting opening 123 such that it extends from a front upper location toward the downstream side of the intake port 122. In other words, the fuel injection apparatus 140 for injecting fuel into the combustion chamber 116 through the intake port 122 is disposed in the proximity of the cylinder head 115.

As can be seen apparently from the foregoing description, the fuel injection system is a so-called intake port injection system wherein the fuel injection apparatus 140 is mounted in an inclined state on the intake port 122 such that fuel Fu may be injected from the fuel injection apparatus 140 at a front upper location toward the intake valve 121.

Figure 10B:
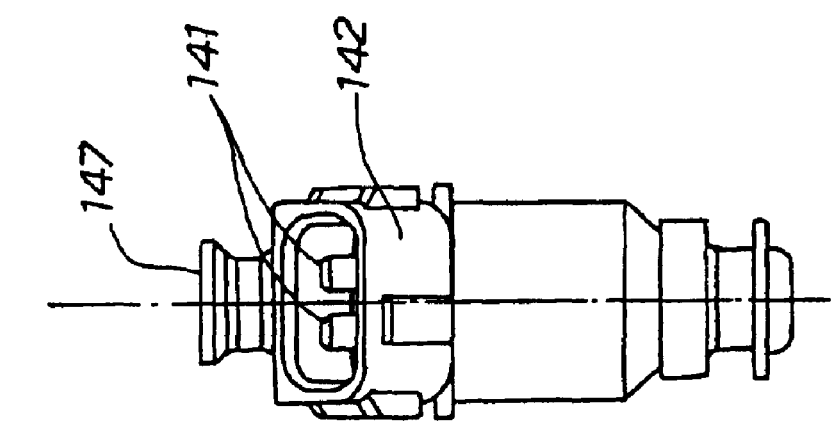
FIGS. 10(a) and 10(b) are views showing a configuration of a fuel injection apparatus according to the present invention.
Figure 10A:
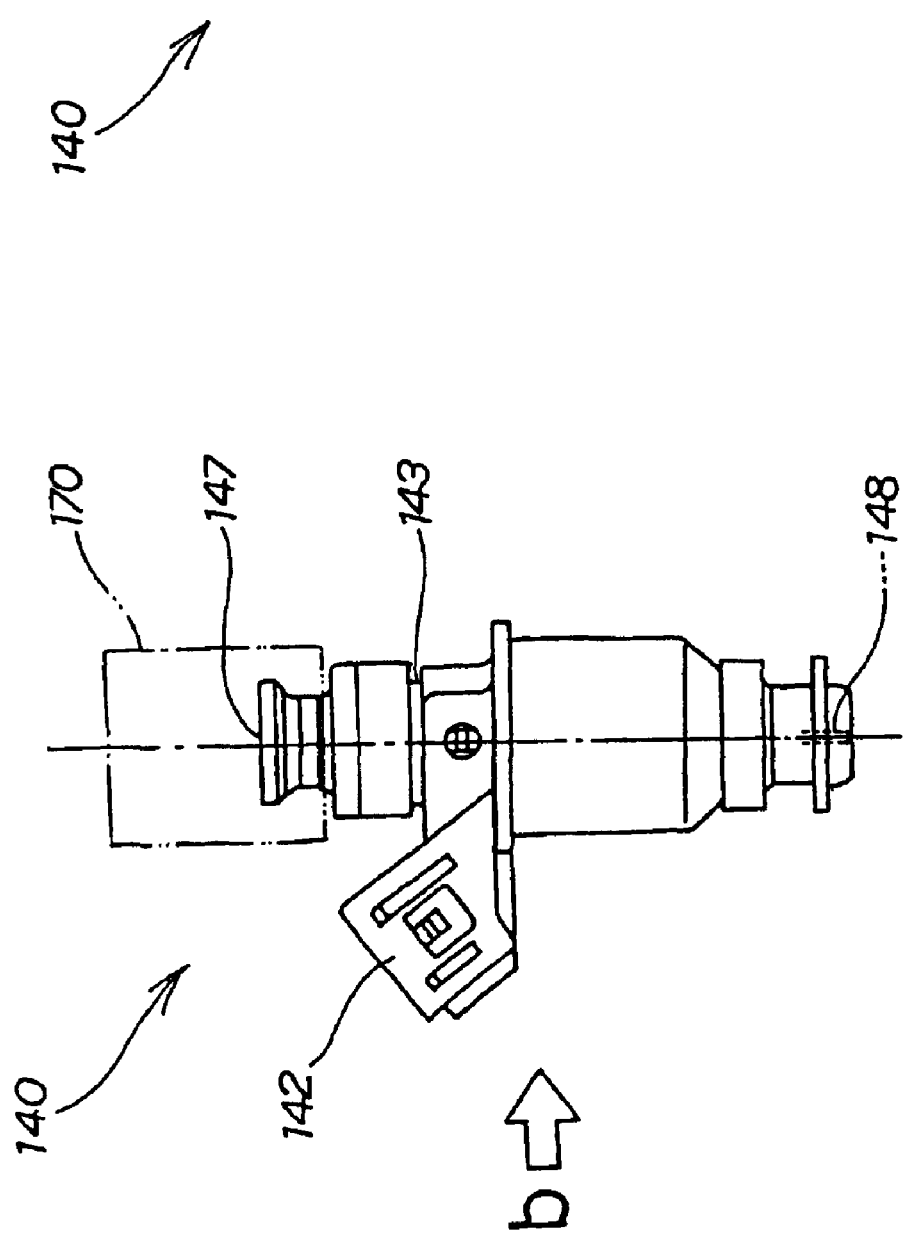

FIGS. 10(a) and (b) are views showing a configuration of the fuel injection apparatus according to the present invention, wherein FIG. 10(a) shows a side face configuration of the fuel injection apparatus 140 and FIG. 10(b) shows a configuration of the fuel injection apparatus 140 as viewed in the direction indicated by b in FIG. 10(a).

The fuel injection apparatus 140 is an injector for injecting fuel based on an injection signal calculated by an electronic control unit not shown and is formed from, for example, a solenoid valve type nozzle. A terminal 141, a coupler 142 and a mounting groove 143 are provided.

Figure 11:
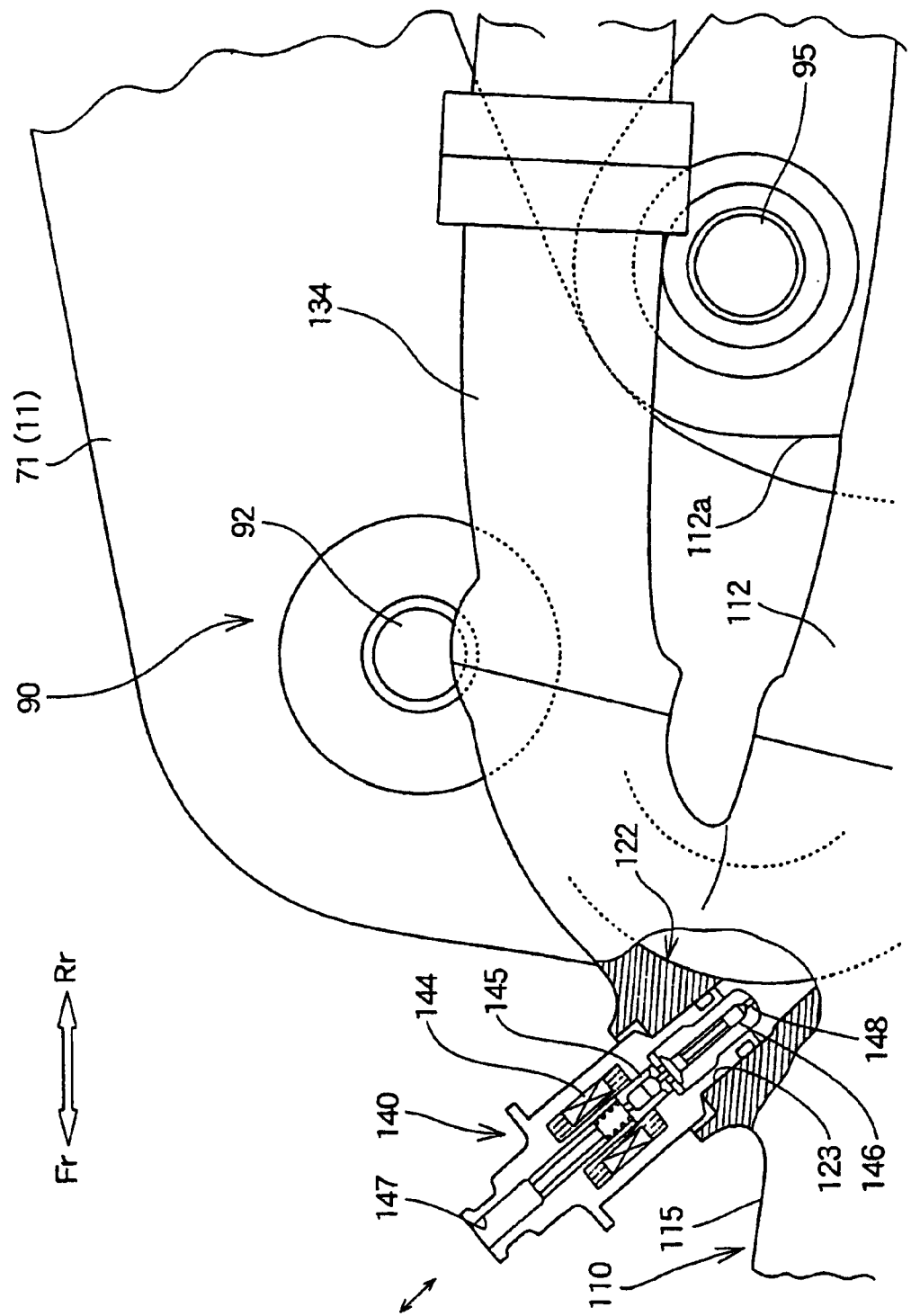
FIG. 11 is a left side elevational view showing a relationship between a damping link mechanism and the fuel injection apparatus according to the present invention.

FIG. 11 is a left side elevational view showing a relationship between a damping link mechanism and the fuel injection apparatus according to the present invention and shows the fuel injection apparatus 140 in a schematic cross section.

According to the present invention, the fuel injection apparatus 140 is mounted on the engine 110 on the forward side of the vehicle body with respect to the frame side pivot 92 when the motorcycle 10, refer to FIG. 2, is viewed from a side thereof.

In the fuel injection apparatus 140, a solenoid 144 is excited based on an injection signal to attract a plunger 145 to slidably move, and thereupon a valve 146 is opened in response to the sliding movement of the plunger 145. Consequently, fuel supplied from a fuel entrance portion 147 at an upper end of the fuel injection apparatus 140 can be injected from an injection nozzle 148 at a lower end of the fuel injection apparatus 140.

The operation of the configuration described above will now be described with reference to FIG. 7.

The intake port 122, having a substantially U-shape which is convex in the forward direction of the vehicle body is provided on the cylinder head 115 on the downstream side with respect to the throttle body 133, and the fuel injection apparatus 140 is disposed at a front end portion of the intake port 122. In other words, the fuel injection apparatus 140 is mounted on the engine 110 at a position spaced from the throttle body 133. The heightwise dimension of the throttle body 133 is generally smaller than the heightwise dimension of a carburetor itself. The height of the top of the throttle body 133 incorporated in the intake system 130 can be suppressed when compared with that in an alternative conventional case wherein a carburetor is disposed.

Furthermore, at a position forwardly of the vehicle body with respect to the joining portion between the engine 110 whose cylinder extends forwardly and substantially horizontally and the inlet pipe 134, the fuel injection apparatus 140 is mounted on the engine 110 such that it extends from a front upper location toward a rear downward location. In particular, the cylinder head 115 is disposed at a position lower than the throttle body 133 and the inlet pipe 134, and the fuel injection apparatus 140 is mounted at a front end portion of the substantially U-shaped intake port 122 provided on the cylinder head 115 such that it extends from a front upper location toward the downstream side of the intake port 122. Therefore, the mounting height of the fuel injection apparatus 140 can be further suppressed.

The linear distance from the frame side pivot 92 to the fuel injection apparatus 140 can be made smaller than the linear distance from the frame side pivot 92 to the engine side pivot 95. As a result, the displacement amount of the fuel injection apparatus 140 when the engine side pivot 95 swings together with the power unit 16 can be made smaller than the displacement amount of the engine side pivot 95. Accordingly, when the power unit 16 swings, the gap between the bottom portion 21a of the article accommodation section 21 and the fuel injection apparatus 140 can be assured readily.

From the foregoing, even when the power unit 16 swings, the total height of the intake system 130 including the throttle body 133, the fuel injection apparatus 140, and fuel supplying pipes such as a fuel hose 173 connected to the fuel injection apparatus 140 can be suppressed. Thus, a sufficient space can be provided between the components just mentioned and the bottom portion 21a of the article accommodation section 21. Accordingly, there is no necessity to make the bottom portion 21a of the article accommodation section 21 concave upwardly. As a result, the accommodation capacity of the article accommodation section 21 can be readily increased. Furthermore, the accommodation capacity of the article accommodation section 21 can be assured while the height of the seat 22, refer to FIG. 1, is reduced.

Now, a mounting structure for the fuel injection apparatus 140 is described in detail with reference to FIGS. 9 and 12 to 14.

Figure 12:
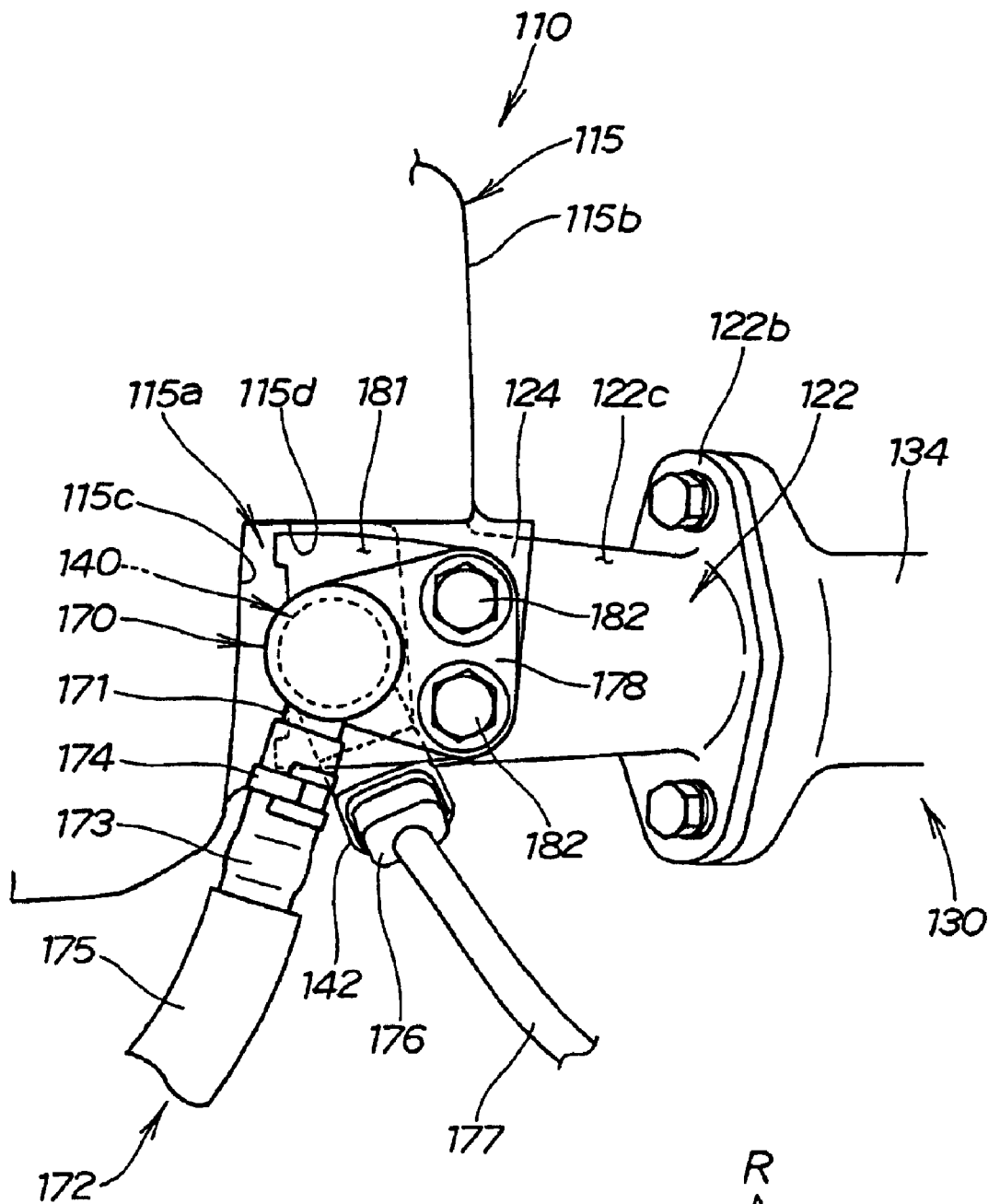
FIG. 12 is a view as viewed in the direction indicated by an arrow mark 12 of FIG. 9.
Figure 13:
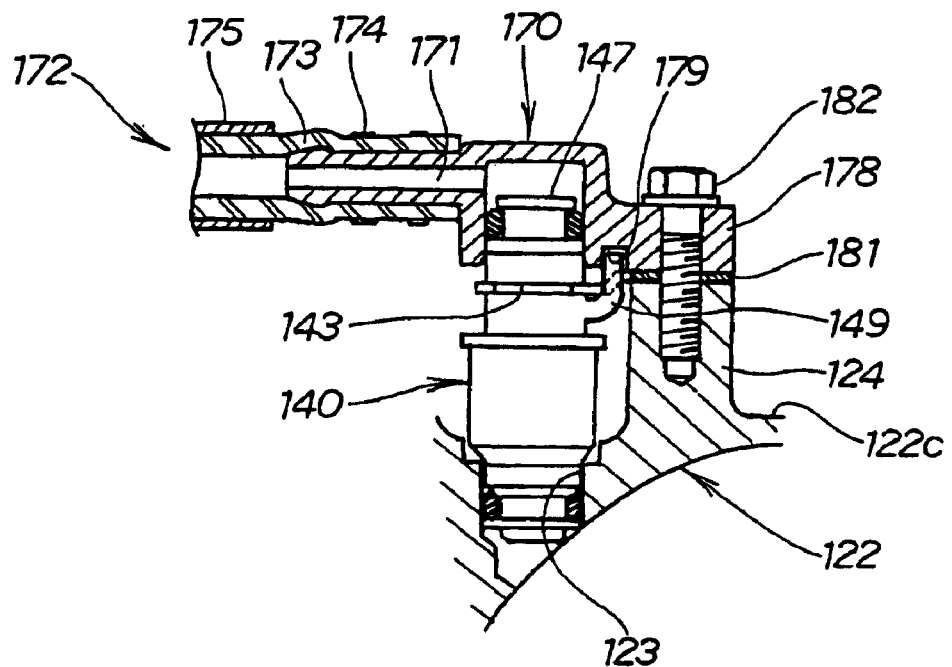
FIG. 13 is a sectional view (part 1) of a mounting structure for the fuel injection apparatus according to the present invention.
Figure 14:
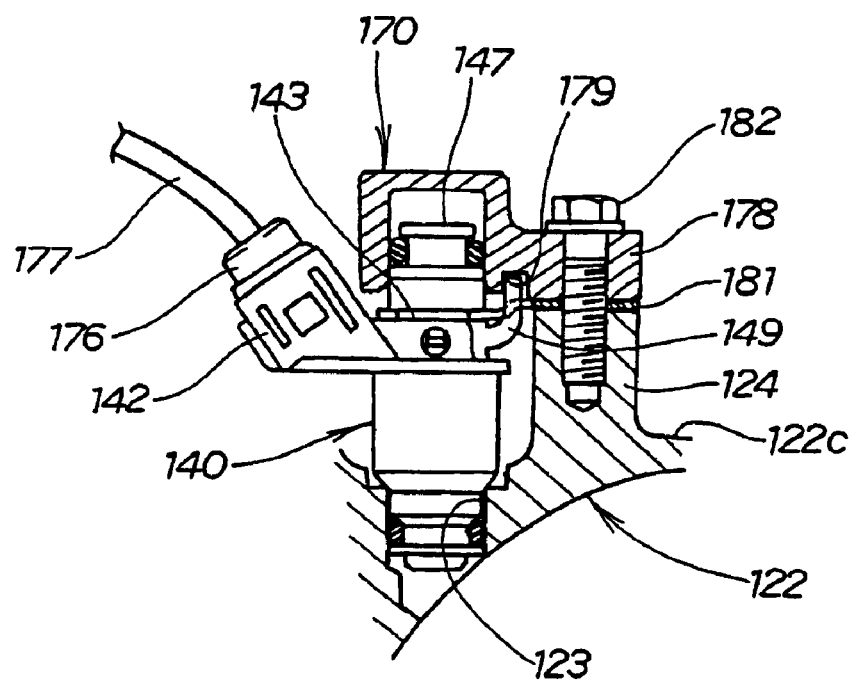
FIG. 14 is a sectional view (part 2) of the mounting structure for the fuel injection apparatus according to the present invention.

FIG. 12 is a view as viewed in the direction indicated by an arrow mark 12 of FIG. 9 and shows a configuration of the fuel injection apparatus 140, a mounting boss 124, the fuel hose 173 and a harness 177 as viewed from a front upper location. FIG. 13 is a sectional view (part 1) of the mounting structure for the fuel injection apparatus according to the present invention, and corresponds to FIG. 9 and shows a sectional structure of the fuel injection apparatus 140, mounting boss 124 and fuel hose 173. FIG. 14 is a sectional view (part 2) of the mounting structure for the fuel injection apparatus according to the present invention, and corresponds to FIG. 9 and shows a sectional structure of the fuel injection apparatus 140, mounting boss 124 and harness 177.

As shown in FIGS. 12 and 13, the fuel injection apparatus 140 is connected to a fuel supply system 172 through a fuel supply joint 170 connected to the fuel entrance portion 147 at an upper portion thereof. More particularly, the fuel supply joint 170 is connected by fitting to the fuel entrance portion 147 at an upper end of the fuel injection apparatus 140. Further, a hose joint 171 extends radially outwardly from a side portion of the fuel supply joint 170, and the fuel hose 173 of the fuel supply system 172 is connected to the hose joint 171. A hose band 175 and a hose protector 175 are provided.

As shown in FIGS. 12 and 14, a coupler 142 is connected to the harness (cable) 177 through a connector 176. Further, referring to FIG. 12, the fuel hose 173, connected to the hose joint 171, and the harness 177 connected to the coupler 142 are disposed such that they do not interfere with each other and do not interfere with the cylinder head 115 either.

Incidentally, referring to FIGS. 9 and 12 to 14, the intake port 122 includes the mounting boss 124 that is provided integrally on an outer face 122c thereof and the fuel injection apparatus 140 and the fuel supply joint 170 are mounted together on the mounting boss 124 by bolting.

More particularly, the mounting boss 124 is disposed rearwardly of the fuel injection apparatus 140, at a position rather near to the inlet pipe 134 and extends substantially in parallel to the longitudinal direction of the fuel injection apparatus 140. Such a mounting boss 124 as just described is an elongated projection which extends in a direction substantially perpendicular to the direction in which the inlet pipe 134 extends such that it is disposed in such a manner as to surround a rear portion of the fuel injection apparatus 140, adjacent the inlet pipe 134.

The fuel injection apparatus 140 can be mounted onto the mounting boss 124 by bolting a mounting stay 181 in the form of a plate to an end face of the mounting boss 124 and fitting an end of the mounting stay 181 into the mounting groove 143 of the fuel injection apparatus 140.

The plate-formed mounting stay 181 is formed in a somewhat bent state such that a portion thereof which is fitted in the mounting groove 143 is positioned lower than the other portion thereof attached to the mounting boss 124 so as to raise the flexural rigidity thereof in a thicknesswise direction. It is to be noted that the mounting stay 181 may otherwise be formed in a flattened configuration without being bent.

The fuel supply joint 170 is configured such that it is bolted to the mounting boss 124 together with the mounting stay 181 provided for mounting the fuel injection apparatus 140 on the mounting boss 124. In particular, a stay portion 178 extends radially outwardly from a side portion of the fuel supply joint 170, and the plate-formed mounting stay 181 and the stay portion 178 are placed in this order on the mounting boss 124 and fastened together by means of a plurality of bolts 182.

A turning motion of the fuel supply joint 170 can be prevented by mounting the stay portion 178 on the mounting boss 124. As a result, the position of the hose joint 171 can be fixed. Furthermore, by fitting a turning preventing projection 149 extending upwardly from the fuel injection apparatus 140 into a turning preventing recess 179 formed on a lower face of the fuel supply joint 170, a turning motion of the fuel injection apparatus 140 can be prevented. As a result, the position of the coupler 142 can be fixed. It is to be noted that the turning preventing projection 149 extends through the mounting stay 181.

Furthermore, the present invention includes, as shown in FIGS. 9 and 12, side walls 115c, 115d which form the cylinder head 115 are formed such that they extend along the fuel injection apparatus 140 so that at least part of the fuel injection apparatus 140 is surrounded by the side walls 115c, 115d.

More particularly, the cylinder head 115 is recessed at a corner portion at a left rear portion thereof, and the fuel injection apparatus 140 and the fuel supply joint 170 are disposed in the recessed portion 115a. By the configuration just described, front portions and right side portions of the fuel injection apparatus 140 and the fuel supply joint 170 can be surrounded by the side walls 115c, 115d of the recessed portion 115a of the side wall 115b which forms the cylinder head 115.

It is to be noted that the cylinder head 115 is enlarged rearwardly at the side wall 115d with respect to the side wall 115c to provide the recessed portion 115a. By enlarging the side wall 115d rearwardly, a breather chamber (not shown) can be provided in the cylinder head 115.

Now, the operation of the mounting structure for the fuel injection apparatus 140 is described with reference to FIGS. 9 and 12 to 14.

The mounting boss 124 is provided on the outer face 122c of the intake port 122 rearwardly of the fuel injection apparatus 140 which injects fuel into the combustion chamber 116 through the intake port 122. The fuel injection apparatus 140 is mounted on the mounting boss 124. Consequently, the fuel injection apparatus 140 can be mounted firmly on the outer face 122c of the intake port 122. Therefore, road surface oscillation during operation that is transmitted to the fuel injection apparatus 140 to cause resonance of the fuel injection apparatus 140 can be suppressed very readily. As a result, the durability of the fuel injection apparatus 140 can be further enhanced.

Furthermore, the fuel injection apparatus 140 can be protected readily against external force from the rear by the mounting boss 124 provided rearwardly of the fuel injection apparatus 140. Besides, since the mounting boss 124 also has a role as a protection member for protecting the fuel injection apparatus 140, there is no necessity to provide a new protection member. Accordingly, the fuel injection apparatus 140 can be protected with a simple configuration.

For example, a rear portion of the fuel injection apparatus 140 can be positioned nearer to the body frame (vehicle body) 11 and other members shown in FIG. 7. Therefore, the degree of freedom in the arrangement of the members can be increased and miniaturization of the motorcycle 10 can be anticipated.

Furthermore, when the engine 110 mounted on the fuel injection apparatus 140 is to be assembled to the body frame 11 or maintenance or inspection of the engine 110 is to be performed, there is no necessity to pay attention so that a rear portion of the fuel injection apparatus 140 may not be hit any other member. Therefore, an assembling operation and a maintenance and inspection operation can be performed readily, and the number of man-hours for working can be reduced.

Further, since the mounting boss 124 which plays a roll also of a protection member is disposed such that it surrounds a rear portion of the fuel injection apparatus 140, the fuel injection apparatus 140 can be protected with a high degree of certainty against external force from the rear with a simple configuration.

Further, since the side walls 115c, 115d which form the cylinder head 115 are formed such that they extend along the fuel injection apparatus 140, at least part of the fuel injection apparatus 140 can be surrounded by the side walls 115c, 115d. Therefore, the fuel injection apparatus 140 can be protected from an external force even by the side walls 115c, 115d which form the cylinder head 115. As a result, the protection performance for protecting the fuel injection apparatus 140 can be further enhanced.

Besides, since the side walls 115c, 115d play a roll also of a protection member for protecting the fuel injection apparatus 140, there is no necessity to provide a new protection member. Accordingly, the fuel injection apparatus 140 can be protected by a simple configuration.

Furthermore, since at least part of the fuel injection apparatus 140 is surrounded by the side walls 115c, 115d, operation sound of the fuel injection apparatus 140 can be suppressed from being transmitted to the outside. In particular, by surrounding a front portion of the fuel injection apparatus 140 with the cylinder head 115, side wall 115c, and surrounding a side portion of the fuel injection apparatus 140 with the side wall 115d of the cylinder head 115 and also surrounding a rear portion of the fuel injection apparatus 140 with the mounting boss 124 and surrounding an upper portion of the fuel injection apparatus 140 with the fuel supply joint 170, the sound during operation of the fuel injection apparatus 140 can be suppressed significantly from being transmitted to the outside.

In addition, since the fuel supply joint 170 connected to an upper portion of the fuel injection apparatus 140 is bolted to the mounting boss 124 together with the mounting stay 181 provided for mounting the fuel injection apparatus 140 on the mounting boss 124, the number of the mounting boss 124 and bolts 82 can be reduced to one half. Accordingly, the number of parts can be made small and the number of man-hours in the assembling operation can be reduced.

Subsequently, a modification to the mounting structure for the fuel injection apparatus 140 is described with reference to FIG. 15. It is to be noted that like elements to those of the embodiment described hereinabove with reference to FIGS. 9 to 14 are denoted by like reference characters and description of them is omitted herein.

Figure 15:
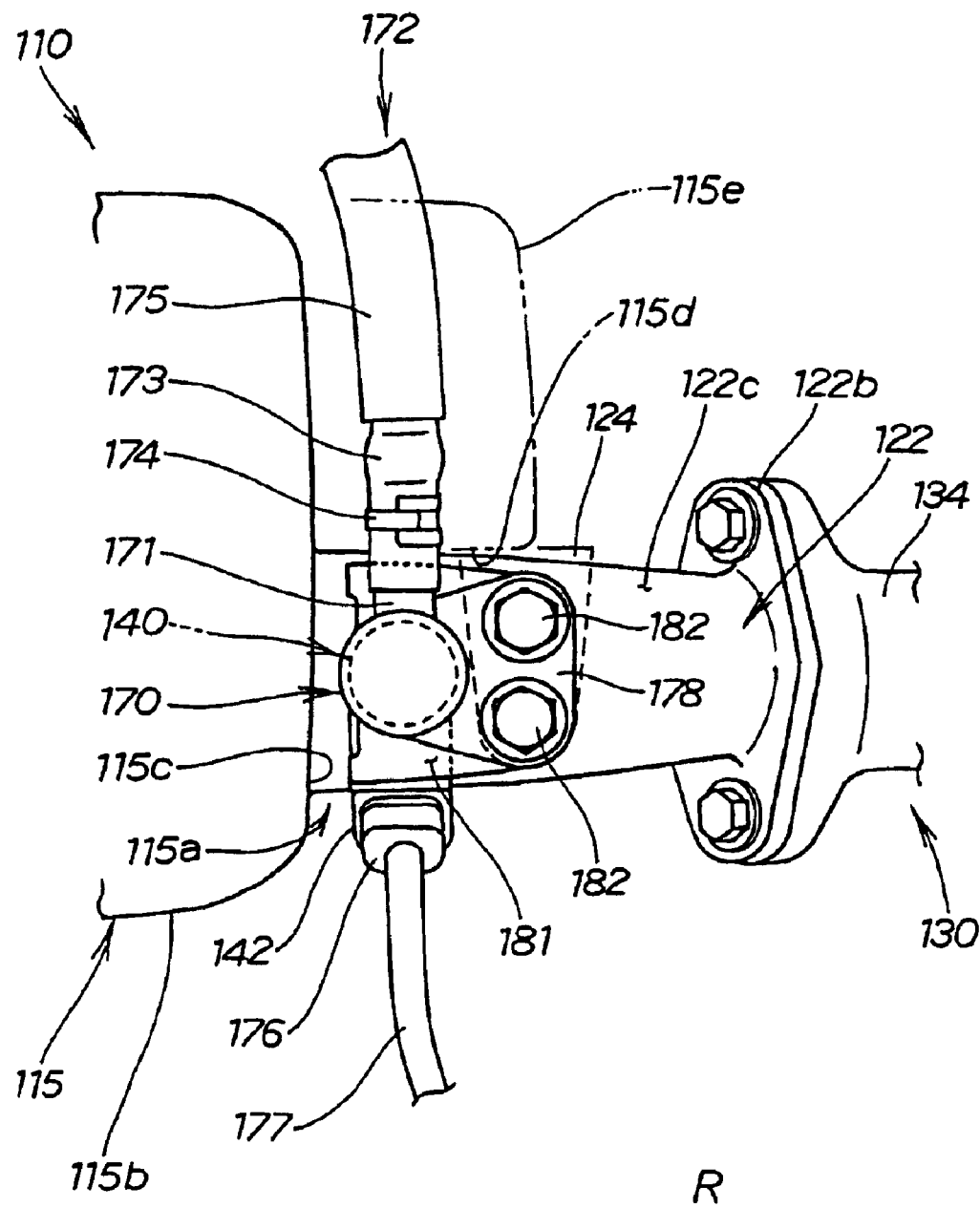
FIG. 15 is a view of a modification to the mounting structure for the fuel injection apparatus according to the present invention.

FIG. 15 is a view of the modification to the mounting structure for the fuel injection apparatus according to the present invention and shows the modification in a corresponding relationship to FIG. 12.

The modification to the mounting structure for the fuel injection apparatus 140 that includes the side wall 115b which forms the cylinder head 115, only the side wall 115c is left while the portion of the side wall 115d indicated by an imaginary line is omitted. In particular, a rear portion 115e indicated by the imaginary line is removed from the cylinder head 115. In the present modification, front portions of the fuel injection apparatus 140 and the fuel supply joint 170 can be surrounded by the side wall 115c.

Since only the front portion of the fuel injection apparatus 140 is surrounded by the side wall 115c, the fuel hose 173 connected to the hose joint 171 and the harness 177 connected to the coupler 142 can be disposed in a leftwardly and rightwardly distributed condition. Connection of the fuel hose 173 and the harness 177 is further facilitated.

Subsequently, details of the throttle body 133 are described with reference to FIGS. 16(a) to (e) which are views showing a configuration of the throttle body according to the present invention.

Figure 16A:
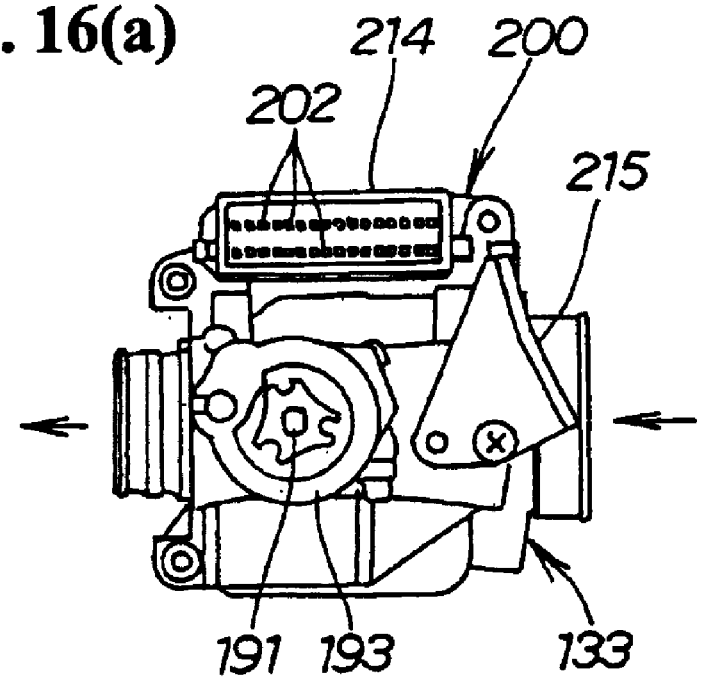
FIGS. 16(a) to 16(e) are views showing a configuration of a throttle body according to the present invention.

FIG. 16(a) shows a configuration of the front of the throttle body 133 and corresponds to FIG. 7.

Figure 16B:
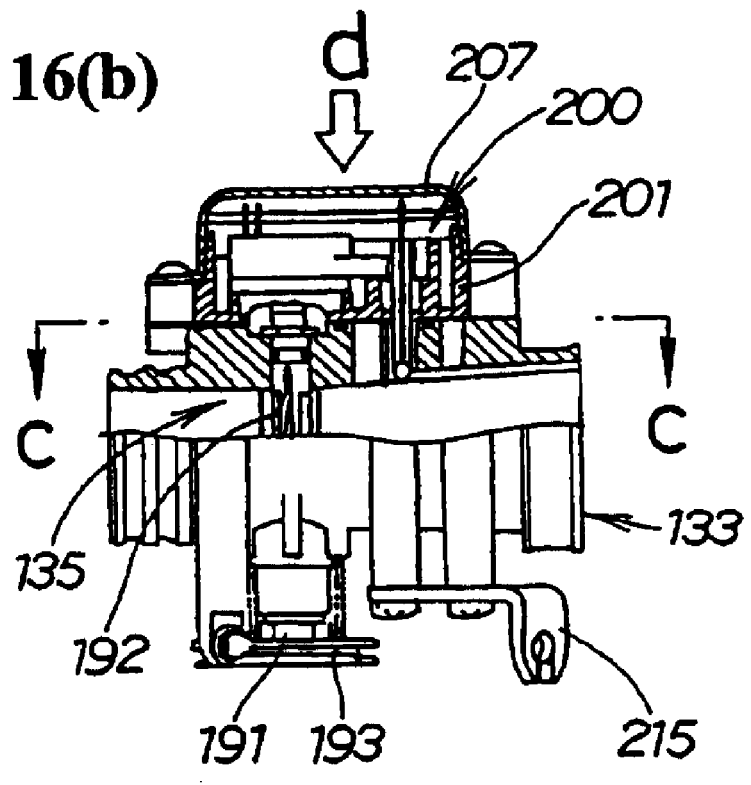

FIG. 16(b) shows a configuration in plan with the throttle body 133 taken partly in section and corresponds to FIG. 8.

Figure 16C:
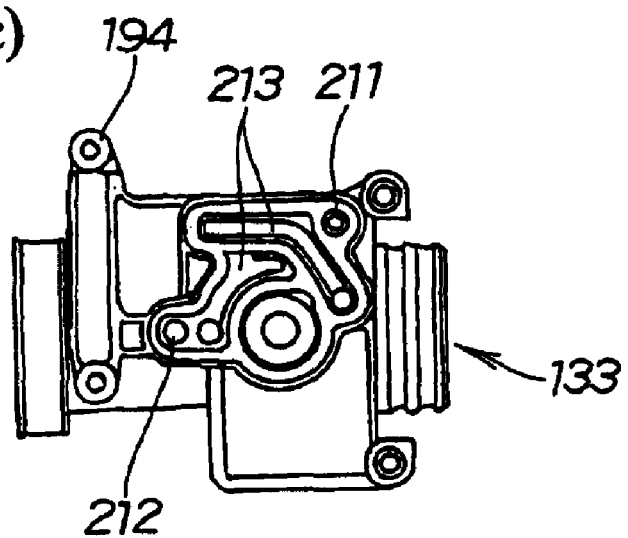

FIG. 16(c) shows a configuration of a section taken along line c—c of FIG. 16(b) and shows throttle body 133 as viewed from the rear in a state wherein an electronic control unit 200 is removed. However, FIG. 16(c) shows the configuration reversely in the leftward and rightward directions to FIG. 16(b).

Figure 16D:
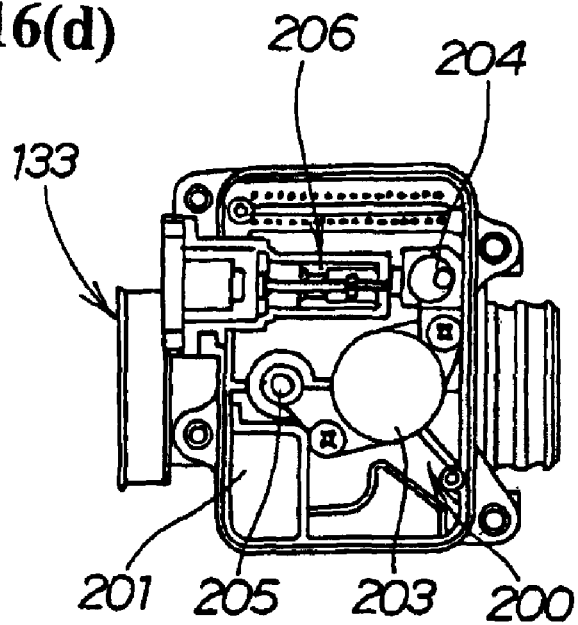

FIG. 16(d) is a view as viewed in the direction indicated by an arrow mark d of FIG. 16(b) and shows the electronic control unit 200 with a cover 207 removed and the throttle body 133 as viewed from the rear. However, FIG. 16(d) shows the configuration reversely in the leftward and rightward directions to FIG. 16(b).

Figure 16E:
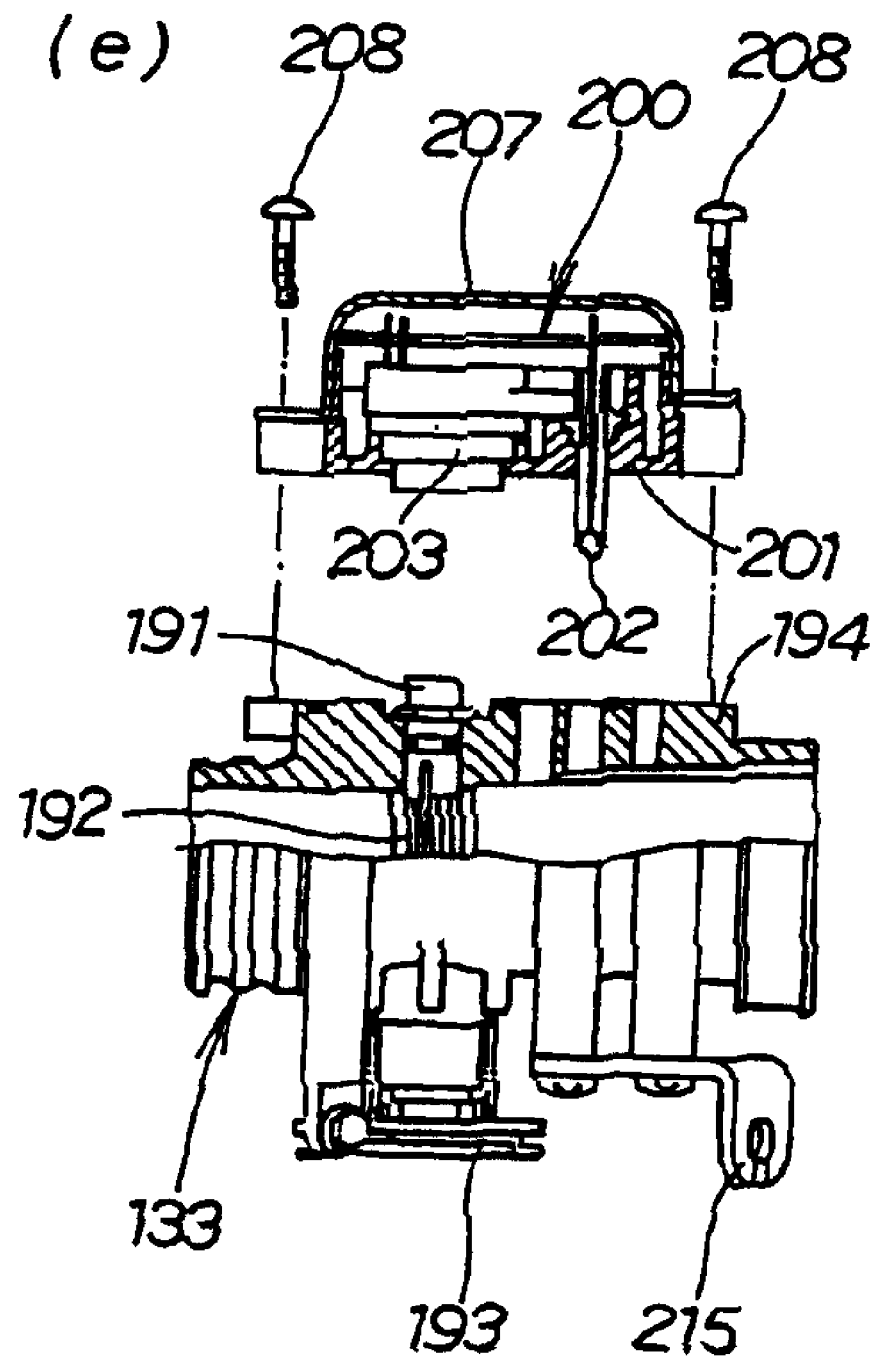

FIG. 16(e) shows a configuration of the throttle body 133 and the electronic control unit 200 disassembled from each other and corresponds to FIG. 16(b).

The throttle valve 135 provided in the throttle body 133 is a valve of the butterfly damper type wherein a damper plate (valve body) 192 is mounted on a valve rod 191. A driven pulley 193 is mounted at an end portion of the valve rod 191, and an actuator (not shown) is connected to the driven pulley 193 through a cable (not shown). The throttle valve 135 can be controlled by the actuator with a control signal of the electronic control unit 200. The electronic control unit 200 further controls the fuel injection apparatus 140, refer to FIG. 7.

The electronic control unit 200 includes terminals 202, a throttle opening sensor 203, an intake negative pressure sensor 204, an intake temperature sensor 205 and an idling air control valve 206 mounted on a board 201 to form a unit.

By placing the electronic control unit 200 and the cover 207 on a flange 194 on the rear face of the throttle body 133 and fastening them together by means of screws 208 they can be integrated with each other.

Since the sensors and so forth are concentrated to form the electronic control unit 200 as an independent module in this manner, the throttle body 133 can be formed in a module type with high flexibility, and significant reduction of the cost can be anticipated.

A hole 211 for the intake negative pressure sensor, a hole 212 for the intake temperature sensor, an air path 213 for the idling air control valve, a coupler 214 and a cable mounting bracket 215 are provided.

It is to be noted that, in the embodiment of the present invention described above, the small size vehicle is not limited to a motorcycle but may otherwise be a motor tricycle or an automobile.

A plurality of mounting bosses 124 may be provided.

The present invention exhibits the following effects through the configuration described above.

According to the present invention, the mounting boss is provided on the outer face of the intake port rearwardly of the fuel injection apparatus which injects fuel into the combustion chamber through the intake port, and the fuel injection apparatus is mounted on the mounting boss. Consequently, the fuel injection apparatus can be mounted firmly on the outer face of the intake port. Therefore, road surface oscillation during operation that is transmitted to the fuel injection apparatus to cause resonance of the fuel injection apparatus can be suppressed very readily. As a result, the durability of the fuel injection apparatus can be further enhanced.

Further, according to the present invention, the fuel injection apparatus can be protected readily against external force from the rear by the mounting boss provided rearwardly of the fuel injection apparatus. In addition, since the mounting boss plays also a role as a protection member for protecting the fuel injection apparatus, there is no necessity to provide a new protection member. Accordingly, the fuel injection apparatus can be protected with a simple configuration.

For example, a rear portion of the fuel injection apparatus can be positioned nearer to the body frame and other members. Therefore, the degree of freedom in arrangement of the members can be increased and miniaturization of the small size vehicle can be anticipated.

Furthermore, when the engine mounted on the fuel injection apparatus is to be assembled to the vehicle body or maintenance or inspection of the engine is to be performed, there is no necessity to pay attention so that a rear portion of the fuel injection apparatus may not contact any other member. Therefore, an assembling operation and a maintenance and inspection operation can be performed readily, and the number of man-hours for working can be reduced.

According to the present invention, the mounting boss which plays a roll also of a protection member is disposed such that it surrounds a rear portion of the fuel injection apparatus. Therefore, the fuel injection apparatus can be protected with a high degree of certainty against external force from the rear with a simple configuration.

According to claim 3, since the side wall which forms the cylinder head is formed such that it extends along the fuel injection apparatus, at least part of the fuel injection apparatus can be surrounded by the side wall. Therefore, the fuel injection apparatus can be protected from external force even by the side wall which forms the cylinder head. As a result, the protection performance for protecting the fuel injection apparatus can be further enhanced.

In addition, since the side wall plays a roll as a protection member for protecting the fuel injection apparatus, there is no necessity to provide a new protection member. Accordingly, the fuel injection apparatus can be protected by a simple configuration.

Furthermore, since at least part of the fuel injection apparatus is surrounded by the side wall, the operational sound of the fuel injection apparatus can be suppressed from being transmitted to the outside.

According to the present invention, the fuel supply joint connected to an upper portion of the fuel injection apparatus is bolted to the mounting boss together with the mounting stay provided for mounting the fuel injection apparatus on the mounting boss. Therefore, the number of the mounting boss and bolts can be reduced to one half. Accordingly, the number of parts can be made small and the number of man-hours in assembling operation can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting structure for a fuel injection apparatus for an engine of a small size vehicle such as a motorcycle having an engine with a cylinder extending forwardly and substantially horizontally and wherein an intake port extends substantially rearwardly from an upper portion of a cylinder head of said engine and a fuel injection apparatus for injecting fuel into a combustion chamber through said intake port is disposed in the proximity of said cylinder head comprising:

a mounting boss being provided on an outer face of said intake port rearwardly of said fuel injection apparatus and said fuel injection apparatus is mounted on said mounting boss, wherein a side wall forming said cylinder head extends alone said fuel injection apparatus so that at least part of said fuel injection apparatus is surrounded by said side wall.

2. The mounting structure for a fuel injection apparatus for an engine of a small size vehicle according to claim 1, wherein said mounting boss surrounds a rear portion of said fuel injection apparatus.

3. The mounting structure for a fuel injection apparatus for an engine of a small size vehicle according to claim 2, wherein a side wall forming said cylinder head extends along said fuel injection apparatus so that at least part of said fuel injection apparatus is surrounded by said side wall.

4. The mounting structure for a fuel injection apparatus for an engine of a small size vehicle according to claim 1, wherein said fuel injection apparatus is connected to a fuel supply system through a fuel supply joint connected to an upper portion thereof, and said fuel supply joint is bolted to said mounting boss together with a mounting stay provided for mounting said fuel injection apparatus on said mounting boss.

5. The mounting structure for a fuel injection apparatus for an engine of a small size vehicle according to claim 2, wherein said fuel injection apparatus is connected to a fuel supply system through a fuel supply joint connected to an upper portion thereof, and said fuel supply joint is bolted to said mounting boss together with a mounting stay provided for mounting said fuel injection apparatus on said mounting boss.

6. The mounting structure for a fuel injection apparatus for an engine of a small size vehicle according to claim 1, wherein said fuel injection apparatus is connected to a fuel supply system through a fuel supply joint connected to an upper portion thereof, and said fuel supply joint is bolted to said mounting boss together with a mounting stay provided for mounting said fuel injection apparatus on said mounting boss.

7. The mounting structure for a fuel injection apparatus for an engine of a small size vehicle according to claim 3, wherein said fuel injection apparatus is connected to a fuel supply system through a fuel supply joint connected to an upper portion thereof, and said fuel supply joint is bolted to said mounting boss together with a mounting stay provided for mounting said fuel injection apparatus on said mounting boss.

8. The mounting structure for a fuel injection apparatus for an engine of a small size vehicle according to claim 1, wherein a linear distance from a frame side pivot to the fuel injection apparatus is less than a linear distance from the frame side pivot to an engine side pivot for reducing the displacement amount of the fuel injection apparatus relative to the displacement amount of the engine side pivot.

9. The mounting structure for a fuel injection apparatus for an engine of a small size vehicle according to claim 1, wherein said mounting boss includes a stay portion extending radially outwardly therefrom for fixing the position of a hose joint connected to the fuel injection apparatus.

10. A mounting structure for a fuel injection apparatus for an engine with a cylinder extending forwardly and substantially horizontally and wherein an intake port extends substantially rearwardly from an upper portion of a cylinder head of said engine and a fuel injection apparatus for injecting fuel into a combustion chamber through said intake port is disposed in the proximity of said cylinder head comprising:

a mounting boss secured to the intake port at a predetermined position disposed rearwardly of said fuel injection apparatus; and wherein said fuel injection apparatus is mounted on said mounting boss in a direction forwardly of the mounting boss, wherein a linear distance from a frame side pivot to the fuel injection apparatus is less than a linear distance from the frame side pivot to an engine side pivot for reducing the displacement amount of the fuel injection apparatus relative to the displacement amount of the engine side pivot.

11. The mounting structure for a fuel injection apparatus for an engine according to claim 10, wherein said mounting boss surrounds a rear portion of said fuel injection apparatus.

12. The mounting structure for a fuel injection apparatus for an engine according to claim 11, wherein a side wall forming said cylinder head extends along said fuel injection apparatus so that at least part of said fuel injection apparatus is surrounded by said side wall.

13. The mounting structure for a fuel injection apparatus for an engine according to claim 10, wherein said fuel injection apparatus is connected to a fuel supply system through a fuel supply joint connected to an upper portion thereof, and said fuel supply joint is bolted to said mounting boss together with a mounting stay provided for mounting said fuel injection apparatus on said mounting boss.

14. The mounting structure for a fuel injection apparatus for an engine according to claim 11, wherein said fuel injection apparatus is connected to a fuel supply system through a fuel supply joint connected to an upper portion thereof, and said fuel supply joint is bolted to said mounting boss together with a mounting stay provided for mounting said fuel injection apparatus on said mounting boss.

15. The mounting structure for a fuel injection apparatus for an engine according to claim 10, wherein said fuel injection apparatus is connected to a fuel supply system through a fuel supply joint connected to an upper portion thereof, and said fuel supply joint is bolted to said mounting boss together with a mounting stay provided for mounting said fuel injection apparatus on said mounting boss.

16. The mounting structure for a fuel injection apparatus for an engine according to claim 12, wherein said fuel injection apparatus is connected to a fuel supply system through a fuel supply joint connected to an upper portion thereof, and said fuel supply joint is bolted to said mounting boss together with a mounting stay provided for mounting said fuel injection apparatus on said mounting boss.

17. The mounting structure for a fuel injection apparatus for an engine according to claim 10, wherein a linear distance from a frame side pivot to the fuel injection apparatus is less than a linear distance from the frame side pivot to an engine side pivot for reducing the displacement amount of the fuel injection apparatus relative to the displacement amount of the engine side pivot.

18. The mounting structure for a fuel injection apparatus for an engine according to claim 10, wherein said mounting boss includes a stay portion extending radially outwardly therefrom for fixing the position of a hose joint connected to the fuel injection apparatus.

19. A mounting structure for a fuel injection apparatus for an engine of a small size vehicle such as a motorcycle having an engine with a cylinder extending forwardly and substantially horizontally and wherein an intake port extends substantially rearwardly from an upper portion of a cylinder head of said engine and a fuel injection apparatus for injecting fuel into a combustion chamber through said intake port is disposed in the proximity of said cylinder head comprising:

a mounting boss being provided on an outer face of said intake port rearwardly of said fuel injection apparatus and said fuel injection apparatus is mounted on said mounting boss, wherein a linear distance from a frame side pivot to the fuel injection apparatus is less than a linear distance from the frame side pivot to an engine side pivot for reducing the displacement amount of the fuel injection apparatus relative to the displacement amount of the engine side pivot.

20. The mounting structure for a fuel injection apparatus for an engine of a small size vehicle according to claim 19, wherein said mounting boss includes a stay portion extending radially outwardly therefrom for fixing the position of a hose joint connected to the fuel injection apparatus.

* * * * *